(12) United States Patent
Nanduri et al.

(10) Patent No.: US 11,062,253 B1
(45) Date of Patent: Jul. 13, 2021

(54) CENTRALIZED STATUS MONITORING IN A MULTIDOMAIN NETWORK

(71) Applicant: Coupang Corp., Seoul (KR)

(72) Inventors: Subrahmanya Pramod Nanduri, Sunnyvale, CA (US); Shuyun McMaster, Bothell, WA (US); Darin Miller, Sammamish, WA (US); Kenny Shi, Bellevue, WA (US)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 17/070,573

(22) Filed: Oct. 14, 2020

(51) Int. Cl.
*G06Q 10/00* (2012.01)
*G06Q 10/08* (2012.01)
*H04L 12/18* (2006.01)
*H04L 12/24* (2006.01)

(52) U.S. Cl.
CPC ....... *G06Q 10/083* (2013.01); *H04L 12/1895* (2013.01); *H04L 41/12* (2013.01)

(58) Field of Classification Search
CPC .... G06Q 10/083; H04L 12/1895; H04L 41/12
See application file for complete search history.

(56) References Cited

U.S. PATENT DOCUMENTS

| 10,607,042 B1* | 3/2020 | Dasgupta | G06F 40/30 |
| 2002/0199190 A1* | 12/2002 | Su | H04N 21/2542 |
| | | | 725/37 |
| 2006/0136309 A1* | 6/2006 | Horn | G06Q 30/0253 |
| | | | 705/26.8 |
| 2012/0259722 A1* | 10/2012 | Mikurak | G06Q 50/12 |
| | | | 705/26.1 |

OTHER PUBLICATIONS

Phemius, Kevin, Mathieu Bouet, and Jérémie Leguay. "Disco: Distributed multi-domain sdn controllers." 2014 IEEE Network Operations and Management Symposium (NOMS). IEEE, 2014. (8 pages).
Poe, Wint Yi, et al. "System architecture of Intelligent Monitoring in multi-domain orchestration." 2017 European Conference on Networks and Communications (EuCNC). IEEE, 2017.

(Continued)

*Primary Examiner* — Khai M Nguyen
(74) *Attorney, Agent, or Firm* — Finnegan, Henderson, Farabow, Garrett & Dunner LLP

(57) ABSTRACT

A system for centralized status monitoring in a multidomain network. The system includes at least one processor and at least one memory device storing instructions that when executed configure the processor to perform operations. The operations include establishing connections with domains, receiving a first request from a first domain to initiate a monitoring operation, and generating a new entry in a status table stored in a first database. The operations also may include receiving a second request from the second domain to update the monitoring operation and, in response to receiving the second request, updating the new entry in the status table by modifying the status field. The operations may also include applying a monitor operation in response to receiving a third request from a monitoring engine and generating an alert comprising entries in the status table in which the status field matches the category status.

20 Claims, 21 Drawing Sheets

(56) References Cited

OTHER PUBLICATIONS

Calyam, Prasad, and Martin Swany. "Research challenges in future multi-domain network performance measurement and monitoring." ACM SIGCOMM Computer Communication Review 45.3 (2015): 29-34.

Wibowo, Franciscus XA, et al. "Multi-domain software defined networking: research status and challenges." Journal of Network and Computer Applications 87 (2017): 32-45.

* cited by examiner login  Sign Up  Service center

| Category | Cheese | ? | 🛒 |

My Orders  Shopping Cart all 'Cheese' (65,586)          Gift Cards filter

65,586 results for 'Cheese'
Related searches: Sliced cheese  baby cheese  cheddar cheese
string cheese  butter  pizza cheese  cream cheese  cheese stick
cubed cheese  parmesan cheese ☐ Fast Delivery
☐ Imported Product 6 per page category
All
Food
Silverware
Kitchen utensils
Home electronics digital
Household goods
  View more brands
  Local Milk
  Daily dairy
  Cattle and trees
View more scope
All stars
  4 or more
  3 or more
  2 or more
  1 or more

FREE Shipping
Sliced cheese, 18g,
100 pieces
(88 won per 10 g)
Morning (Thursday)
(1294)

Mozzarella cheese,
1kg, 2 pieces
(103 won per 10 g)
Tomorrow (Wed)
(285)

100 grams of cheddar
sliced cheese,
18 grams, 100 pieces
(73 won per 10 g)
Morning (Thursday)
(862)

Grated Parmesan
Cheese, 85g, 1 piece
(389 won per 10g)
Tomorrow (Wed)
(839)

Mozzarella cheese,
1 kg, 1
(85 won per 10g)
Morning (Thursday)
(379)

FREE Shipping
1.36 kg of string
cheese
Morning (Thursday)
(337)

FIG. 1B

| id | entity_type | entity | current_state | expected_state | start_time | expectedend_time | end_time | status |
|---|---|---|---|---|---|---|---|---|
| A | ORDERS_MISSED_PDD | asdasd_JIT-ING | COMPLETED | SHIPPED | 2020-06-12 04:02:32 | 2020-06-21 04:02:32 | <null> | 1 |
| B | ORDERS_MISSED_PDD | abcabcabc | SENT_TO_WAREHOUSE | SHIPPED | 2020-06-16 00:00:32 | 2020-06-19 00:00:32 | 2020-06-16 06:20:35 | 3 |
| C | ORDERS_MISSED_PDD | asdfasdf0_JIT-ING | MISSED_PDD | SHIPPED | | 2020-06-21 04:02:32 | <null> | 1 |
| D | ORDERS_MISSED_PDD | abcabcabca | SENT_TO_WAREHOUSE | SHIPPED | 2020-06-16 00:00:32 | 2020-06-29 00:00:32 | 2020-06-16 06:22:35 | 3 |
| E | ORDERS_MISSED_PDD | asasasasas_JIT-ING | SENT_TO_WAREHOUSE | SHIPPED | | 2020-06-21 04:02:32 | <null> | 1 |
| F | ORDERS_MISSED_PDD | qwerqwerqwer | MISSED_PDD | SHIPPED | 2020-06-16 00:00:32 | 2020-06-39 00:00:32 | 2020-06-16 06:32:35 | 3 |
| ... | | | | | | | | |
| Z | ORDERS_MISSED_PDD | iopiopiop | SENT_TO_WAREHOUSE | SHIPPED | 2020-06-16 00:00:32 | 2020-06-49 00:00:32 | 2020-06-16 07:21:36 | 3 |

FIG. 11

PDD Missed Alter or NULL fields

☐ Translate message to: English |

PDDMonitoralert@xyz.com
DATE AND TIME [PERIODICITY]

[Warning]: This email originated from an external source.

Missed PDD Orders:

| OrderNumber | CurrentState | StartDate | ExpectedEndDate | EndTime |
|---|---|---|---|---|
| 28000076591689_JIT-ING | SENT_TO_WAREHOUSE | 2020-07-27 13:07:58.0 | 2020-08-05 13:07:58.0 | null |
| 18000077277817_JIT-ING | SENT_TO_WAREHOUSE | 2020-07-27 17:08:48.0 | 2020-08-05 17:08:48.0 | null |
| ... | | | | |
| 30000077743403_JIT-ING | SENT_TO_WAREHOUSE | 2020-07-27 17:09:13.0 | 2020-08-05 17:09:13.0 | null |

Reply | Reply all | Forward

FIG. 17

CENTRALIZED STATUS MONITORING IN A MULTIDOMAIN NETWORK

TECHNICAL FIELD

The present disclosure generally relates to computerized systems and methods for centralized monitoring in a multidomain network. In particular, embodiments of the present disclosure relate to systems and methods for monitoring the status of orders or tickets through a multidomain network using distributed hypermedia communication for dynamically updating centralized databases and broadcast alerts.

BACKGROUND

Companies and organizations with multiple locations, departments, and/or business units frequently take advantage of networks with multiple domains (also known as multidomain networks) to control, monitor, and organize internal and external communications. Companies usually organize networks with multiple domains to effectively allocate resources and assign tasks. Further, using multiple domain topologies allows network managers to monitor and control communications more efficiently. For example, multidomain networks enable use of hierarchical communication controls using domain managers that filter, route, and scan incoming and outgoing traffic before they are distributed.

Nowadays networks are frequently configured with multiple domains coupled to each other in complex grids and configured to implement convoluted workflows. For example, networks are frequently segregated in security, data center, and customer-facing domains to organize communications and resources. These domains, however, are tightly linked and interact with each other—frequently in real-time. And interdomain interactions need to be fast, unerring, and secure to provide adequate user experience.

The combination of complex network topologies and high performance demands have created challenges for developing and managing multidomain networks. Managing large multidomain networks is complex because domains within the same network may have independent and specialized topologies. Further, domains in a network may have different distribution of resources, non-uniform protocols, or inconsistent network configurations. Moreover, requirements of real-time interdomain interactions frequently impede certain administrative operations that could interfere or delay communications. The combination of a vast variety of domain configurations, topologies, and protocols (even within a single network) with lack of authority for administrative operations, have created important technical challenges to effectively manage multidomain networks.

The disclosed systems and methods for centralized status monitoring in a multidomain network address one or more problems set forth above and/or other problems in the prior art.

SUMMARY

One aspect of the present disclosure is directed to a system for centralized status monitoring in a multidomain network. The system may include at least one processor and at least one memory device including instructions that when executed configure the at least one processor to perform operations. The operations may include establishing connections with a first domain and a second domain, receiving a first request from the first domain to initiate a monitoring operation (the first request comprising a create request), and generating a new entry in a status table stored in a first database, the status table including: (1) an ID field, (2) an expected finish field, and (3) a status field. The operations may also include receiving a second request from the second domain to update the monitoring operation, the second request comprise an update status request and, in response to receiving the second request, updating the new entry in the status table by modifying the status field. Further, the operations may include applying a monitor operation in response to receiving a third request from a monitoring engine (the third request comprising a report request and a category status), where the monitoring engine being configured to periodically generate the third request, and generating an alert comprising entries in the status table in which the status field matches the category status.

Another aspect of the present disclosure is directed to a computer-implemented method for centralized status monitoring in a multidomain network. The method including establishing connections with a first domain and a second domain, receiving a first request from the first domain to initiate a monitoring operation, the first request comprising a create request, and generating a new entry in a status table stored in a first database, the status table including: (1) an ID field, (2) an expected finish field, and (3) a status field. The method may also include receiving a second request from the second domain to update the monitoring operation, the second request comprise an update status request and, in response to receiving the second request, updating the new entry in the status table by modifying the status field. The method may also include applying a monitor operation in response to receiving a third request from a monitoring engine (the third request comprising a report request and a category status), where the monitoring engine being configured to periodically generate the third request; and generating an alert comprising entries in the status table in which the status field matches the category status.

Yet another aspect of the present disclosure is directed to an apparatus. The apparatus includes one or more processors and one or more memory devices comprising instructions that when executed configure the one or more processors to: establish connections with a first domain and a second domain by performing an automated discovery operation. The automated discovery including automatically discovering configuration templates associated with the first domain and the second domain, configuring the first domain (via one or more web APIs associated with the first domain) to generate create requests when new orders are received or orders are sent to fulfillment centers, and configuring the second domain, via one or more web APIs associated with the second domain, to generate update requests when an item is shipped. The instructions further configure the at least one processor to receive a first request from the first domain to initiate a monitoring operation (the first request comprising a first REST API call comprising an order key) the order key encoding an item ID and a vendor ID. The instructions may also configure the at least one processor to generate a new entry in a status table stored in a first database, the status table including: (1) an ID field, (2) an expected finish field, and (3) a status field. The instructions may further configure the at least one processor to receive a second request from the second domain to update the monitoring operation, the second request comprising a second REST API call comprising shipment information and, in response to receiving the second request, update the new entry in the status table by modifying the status field. The instructions may also configure the at least one processor to apply a monitor operation in response to receiving a third request from a monitoring engine (the third request comprising a report request and a category status, the monitoring engine being configured to generating the third request at least once a day, the monitoring operation being performed through an automation server) and broadcasting an alert email in an administrator network comprising entries in the status table in which a value of the status field is at least one of null or missed PDD.

BRIEF DESCRIPTION OF THE DRAWINGS

FIG. 1B depicts a sample Search Result Page (SRP) that includes one or more search results satisfying a search request along with interactive user interface elements, consistent with the disclosed embodiments.

FIG. 11 is an exemplary status table for multidomain monitoring stored in a database, consistent with disclosed embodiments.

FIG. 17 is a graphical user interface showing an alert transmitted through an administrator network, consistent with disclosed embodiments.

DETAILED DESCRIPTION

Figure 1A:
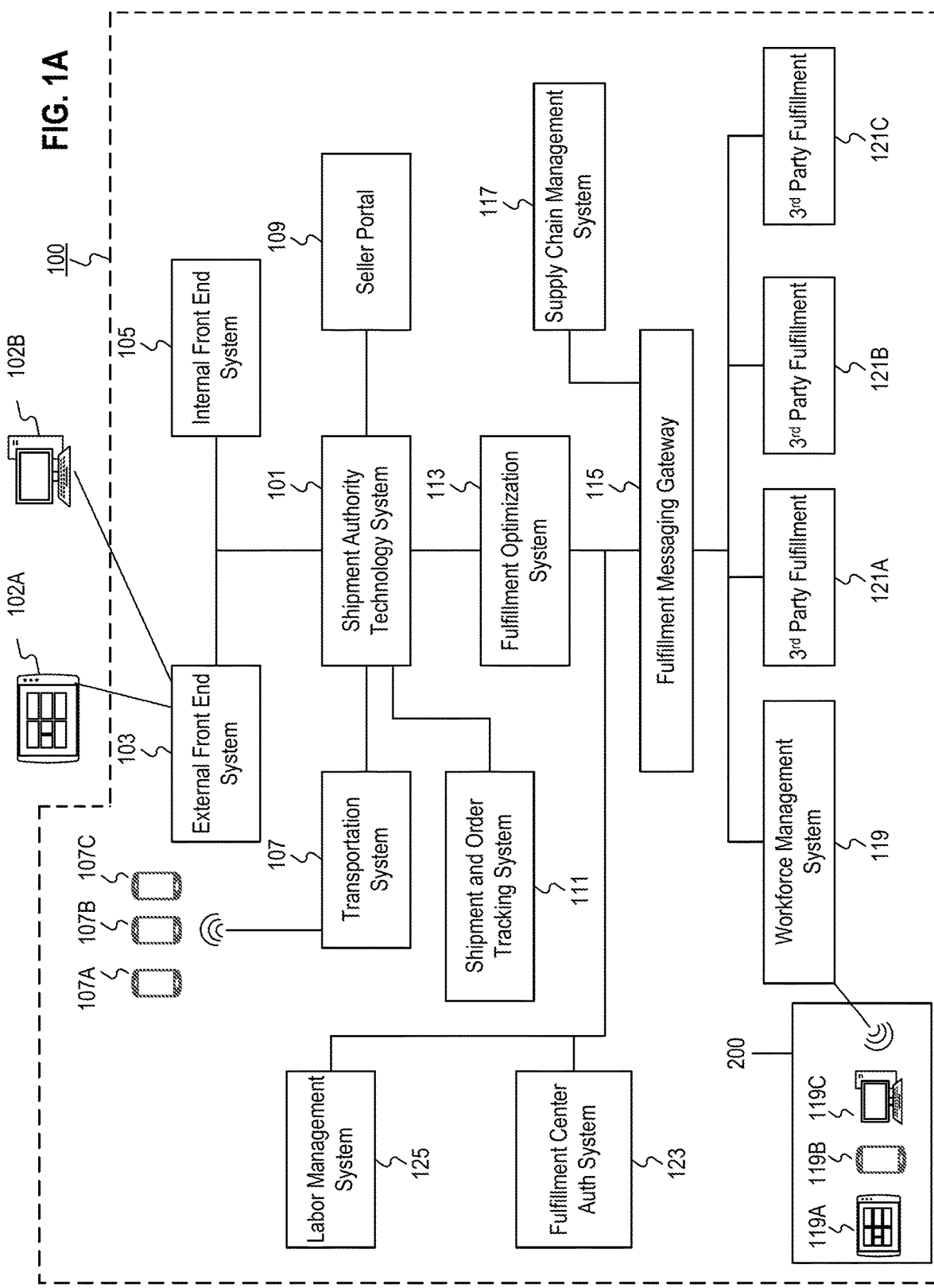
FIG. 1A is a schematic block diagram illustrating an exemplary embodiment of a network including computerized systems for communications enabling shipping, transportation, and logistics operations, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. The following detailed description is not limited to the disclosed embodiments and examples. Instead, the proper scope of the invention is defined by the appended claims.

Embodiments of the present disclosure are directed to systems and methods for order or ticket status monitoring in multidomain networks performing disconnected workflows. Disclosed systems and methods may improve the technical field of monitoring operations through a multiple domain network by creating an automated and centralized reporting system that tracks progress of operations throughout the multidomain network. The disclosed systems may additionally allow programming of devices in multidomain networks to automatically transmit update messages, triggered by events and/or other interdomain communications. Thus, disclosed system and methods for centralized monitoring may improve the technical field of managing multidomain networks by generating a centralized databases that store events to monitor the disconnected workflows across the entire network and provide uniform state variables that allow administrators to identify status and provide reports.

Some embodiments of the disclosed system and methods address problems of monitoring orders in an e-commerce network. For example, disclosed systems enable monitoring the status of customer orders in real-time, regardless of the current processing domain. Such embodiments of disclosed systems may allow a network manager or administrator to easily identify the status of and order or ticket by identifying missed promised delivery dates (PDDs), erred projected delivery date, or delays. Accordingly, the disclosed systems and methods may improve the technical field of multidomain network management by automating monitoring operations and enabling the quick identification and resolution of discontinued workflows.

Some embodiments of the disclosed systems and methods may particularly improve systems of automated shipping that are based on multidomain networks. Multiple disconnected workflows participate of an order fulfillment process, including purchase, order, and shipping workflows. These workflows can be connected with each other but may be executed at their own pace and in different domains. For example, order processing may be process in a domain that is independent from order shipment. The disclosed systems and methods may provide tools to monitor the status of orders throughout multiple domains and to make predictions based on machine-learning models. For instance, data collected and normalized in the centralized databases may be used to train predictive machine learning (ML) models that allow managers to predict orders or tickets delay. Thus, disclosed systems and methods may also improve management of multidomain network by providing predictive and analytics tools.

Furthermore, some embodiments of the disclosed systems and methods may be applied to address problems of monitoring customer orders in multidomain networks to identify orders that missed (or will miss) the projected delivery date or promised delivery date (PDD). However, besides monitoring order deliveries, embodiments of the disclose systems and methods may monitor order purchases or inventory in multidomain networks.

Moreover, the disclosed systems and methods may also improve the technical field of configuring multidomain networks by providing tools to perform an automated discovery operation that automatically configures interdomain communications. For example, in some embodiments disclosed systems and methods may provide tools for connecting multiple domains to a centralized reporting system by employing standardized web-based communication avenues, such as representational state transfer (REST) calls, and configure domains to transmit automated communications triggered by milestones or specific events. Such embodiments of the disclosed systems and methods may solve issues of lack of uniformity and/or administrative authority in multidomain networks.

Embodiments of the disclosed systems and methods may also solve technical issues of configuring monitoring systems in multidomain networks by creating tools to seamlessly expand the group of monitored domains through automated discovery. For example, the disclosed systems and methods may provide tools to automatically identify new domains in a multidomain network, or identify new operations of a network, to generate additional monitoring entities or configure the domains for additional reporting communications. Such embodiments of the disclosed systems and methods may include applying ML algorithms to identify communication patterns in a network and adjust monitoring databases accordingly.

Additionally, embodiments of the disclosed systems and methods may improve management of multidomain systems by automatically monitoring abnormal scenarios and/or delays. For example, disclosed systems and methods may provide a consolidated and centralized state monitoring database, acting like a uniform reporting system, that provides response to status requests and/or generate alerts, tasks, and/or orders. Such embodiments may facilitate management of multidomain systems by generating a reporting service that can be queried in real-time and/or periodically, enabling close monitoring of order or ticket status. Such embodiments of disclosed systems and methods may allow to automatically coordinate disconnected workflows to identify and resolve delays. Further, such embodiments may also improve management of multidomain networks by providing a REST service for on-demand queries of status monitoring.

Embodiments of disclosed systems and methods may also improve bandwidth utilization in multidomain networks by reducing traffic used for monitoring events in multidomain networks. Some embodiments of the disclosed systems and methods may allow monitoring different disconnected workflows with reduced overhead using simple and standardized communications to a centralized system that converges disconnected workflows into few parameters. Such embodiments may improve the performance of multidomain networks by minimizing network congestion. For example, the disclosed systems and methods may improve network communications by reducing, normalizing, and simplifying the communications used for status monitoring.

Reference will now be made to the disclosed embodiments, examples of which are illustrated in the accompanying drawings.

FIG. 1A shows a schematic block diagram of system 100 illustrating an exemplary embodiment of a system including computerized systems for communications enabling shipping, transportation, and logistics operations. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front-end system 103, an internal front-end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front-end system 103 and FO system 113.

External front-end system 103, in some embodiments, may be implemented as a computer system that enables external users to interact with one or more systems in system 100. For example, in embodiments where system 100 enables the presentation of systems to enable users to place an order for an item, external front-end system 103 may be implemented as a web server that receives search requests, presents item pages, and solicits payment information. For example, external front-end system 103 may be implemented as a computer or computers running software such as the Apache HTTP Server, Microsoft Internet Information Services (IIS), NGINX, or the like. In other embodiments, external front-end system 103 may run custom web server software designed to receive and process requests from external devices (e.g., mobile device 102A or computer 102B), acquire information from databases and other data stores based on those requests, and provide responses to the received requests based on acquired information.

In some embodiments, external front-end system 103 may include one or more of a web caching system, a database, a search system, or a payment system. In one aspect, external front-end system 103 may include one or more of these systems, while in another aspect, external front-end system 103 may include interfaces (e.g., server-to-server, database-to-database, or other network connections) connected to one or more of these systems.

An illustrative set of steps, illustrated by FIGS. 1B, 1C, 1D, and 1E, will help to describe some operations of external front-end system 103. External front-end system 103 may receive information from systems or devices in system 100 for presentation and/or display. For example, external front-end system 103 may host or provide one or more web pages, including a Search Result Page (SRP) (e.g., FIG. 1B), a Single Display Page (SDP) (e.g., FIG. 1C), a Cart page (e.g., FIG. 1D), or an Order page (e.g., FIG. 1E). A user device (e.g., using mobile device 102A or computer 102B) may navigate to external front-end system 103 and request a search by entering information into a search box. External front-end system 103 may request information from one or more systems in system 100. For example, external front-end system 103 may request information from FO System 113 that satisfies the search request. External front-end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front-end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. In some embodiments, the SRP may also include delivery options, cutoff times for delivery options and/or hypermedia elements requesting user input. External front-end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front-end system 103. In response, external front-end system 103 may request information related to the selected product. For example, the information may include additional information beyond that presented for a product on the respective SRP. This could include, for example, shelf life, country of origin, weight, size, number of items in package, handling instructions, cutoff time for dawn or first time deliveries, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front-end system 103 may prepare an SDP (Single Display Page) (e.g., FIG. 1C) based on the received product information, location of the customer device, and availability of delivery options. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front-end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. Alternatively, or additionally, the user may interact with the SDP by providing instructions for delivery. The user device may transmit this request to add the product to the shopping cart to external front-end system 103.

Figure 1D:
FIG. 1D depicts a sample cart page that includes items in a virtual shopping cart along with interactive user interface elements, consistent with the disclosed embodiments.
Figure 1E:
FIG. 1E depicts a sample order page that includes items from the virtual shopping cart along with information regarding purchase and shipping, along with interactive user interface elements, consistent with the disclosed embodiments.

External front-end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front-end system 103. In some embodiments, the Cart page may include text box inputs, interactive icons, or recommendation messages for each product delivery.

External front-end system 103 may generate an order page (e.g., FIG. 1E) in response to receiving the request to initiate a purchase. The order page, in some embodiments, re-lists the items from the shopping cart and requests input of payment and shipping information. For example, the order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front-end system 103 may send the Order page to the user device.

The user device may enter information on the order page and click or otherwise interact with a user interface element that sends the information to external front-end system 103. From there, external front-end system 103 may send the information to different systems in system 100 to enable the creation and processing of a new order with the products in the shopping cart. In some embodiments, external front-end system 103 may be further configured to enable sellers to transmit and receive information relating to orders.

Internal front-end system 105, in some embodiments, may be implemented as a computer system that enables internal users (e.g., employees of an organization that owns, operates, or leases system 100) to interact with one or more systems in system 100. For example, in embodiments where SAT system 101 enables the presentation of systems to enable users to place an order for an item, internal front-end system 105 may be implemented as a web server that enables internal users to view diagnostic and statistical information about orders, modify item information, or review statistics relating to orders. For example, internal front-end system 105 may be implemented as a computer or computers running software such as the Apache HTTP Server, Microsoft Internet Information Services (IIS), NGINX, or the like. In other embodiments, internal front-end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front-end system 105 may include one or more of a web caching system, a database, a search system, a payment system, an analytics system, an order monitoring system, or the like. In one aspect, internal front-end system 105 may include one or more of these systems, while in another aspect, internal front-end system 105 may include interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may include devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more users (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front-end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below regarding FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front-end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
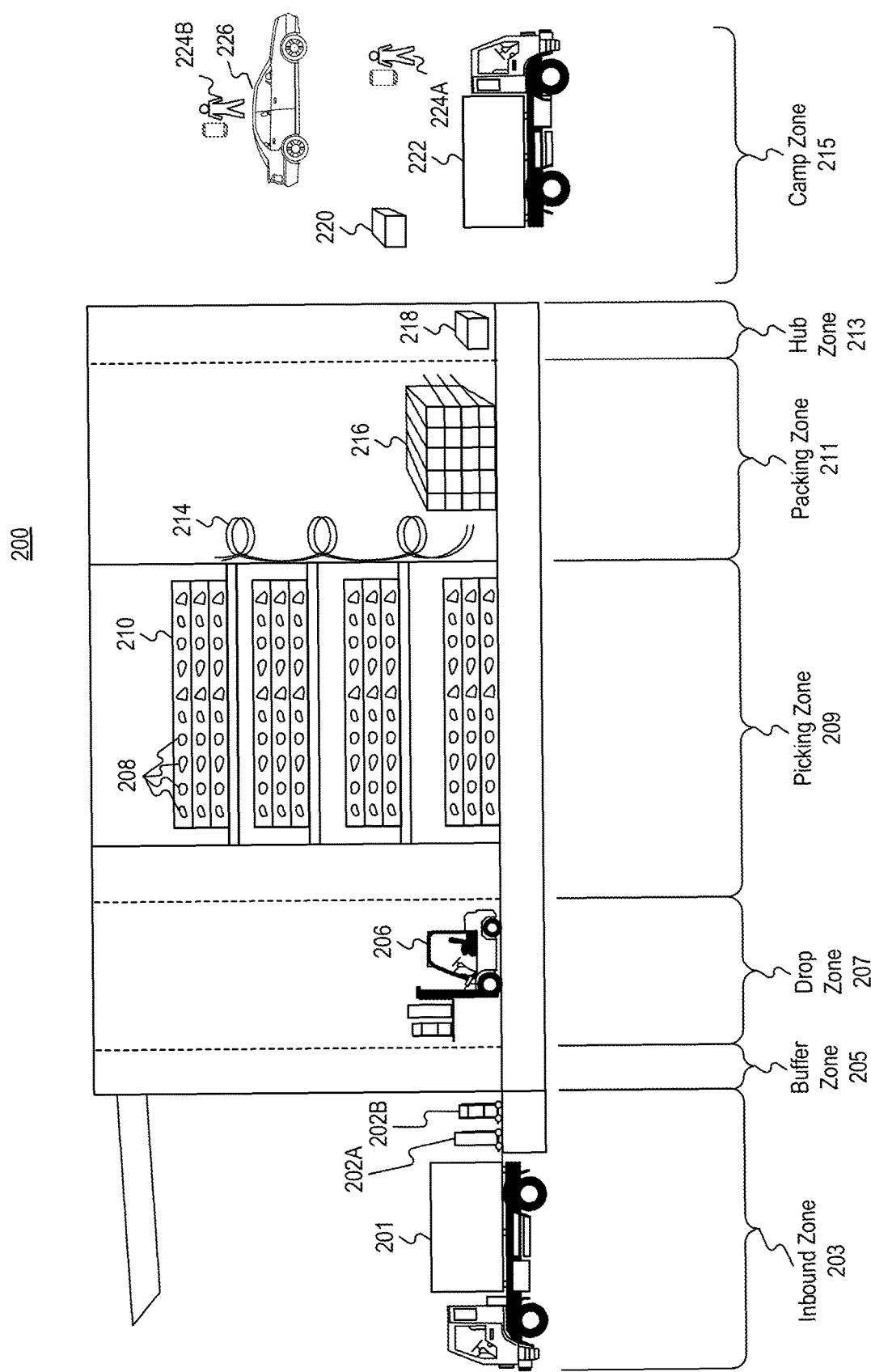
FIG. 2 is a diagrammatic illustration of an exemplary fulfillment center configured to utilize disclosed computerized systems, consistent with the disclosed embodiments.

FIG. 2 depicts a fulfillment center 200. Fulfillment center (FC) 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So, while the "zones" are depicted in FIG. 2, other divisions of zones are possible and the zones in FIG. 2 may be omitted, duplicated, and/or modified in some embodiments.

Inbound zone 203 represents an area of FC 200 where items are received from sellers who wish to sell products using system 100 (FIG. 1A). For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). Such event may update a real time location system that updates a database to specify the item has been moved into the FC. The picker may then take the item to picking zone 209 (e.g., by placing it on a cart or carrying it) and the real time location system may request the position of storage for the new item.

Picking zone 209 may be an area of FC 200 where items 208 are stored on storage units 210. In some embodiments, storage units 210 may include one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. In some embodiments, the location to stow item 202A may be determined based on predictive algorithms that attempt to maximize the availability of special delivery options, such as dawn deliveries. The device may then prompt the picker to scan a barcode at that location before stowing item 202A in that location. Alternatively, a wireless sensor or a camera coupled with image recognition, may store the location of the time. In some embodiments, the device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. In some embodiments, as further described in connection with FIG. 11, the picker may receive instructions through a placement or storing guide to stow the products. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may include, for example, determining a portion of a geographical area that the package is destined for (e.g., based on a postal code) and determining a camp zone 215 associated with the portion of the geographical area.

Camp zone 215, in some embodiments, may include one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, a delivery option, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

In some embodiments, as shown in FIG. 2, one or more of the sections of FC 200 may include a positioning system 217. Positioning system 217 may include a plurality of sensors that may be used to determine the position of products within the FC and track their movement through the FC. In such embodiments, sensors of positioning system 217 may be used for both, tracking the position of products in the FC and also estimating movement between different sections. For instance, sensors of positioning system 217 may be used to store historic data of time elapsed between the different regions of FC 200. This information may then be used for determining distances or estimated times between storing zones and packing zones.

As shown in FIG. 2 the positioning system 217 may include sensors 217A in packing zone 211, sensors 217B in picking zone 209, and sensors 217C in drop zone 205. However, more sensors may be placed in different regions of FC 200 with the goal of tracking and capturing the position of items FC 200 and improve the accuracy of estimated deliveries or maximize the availability of delivery options.

Figure 3:
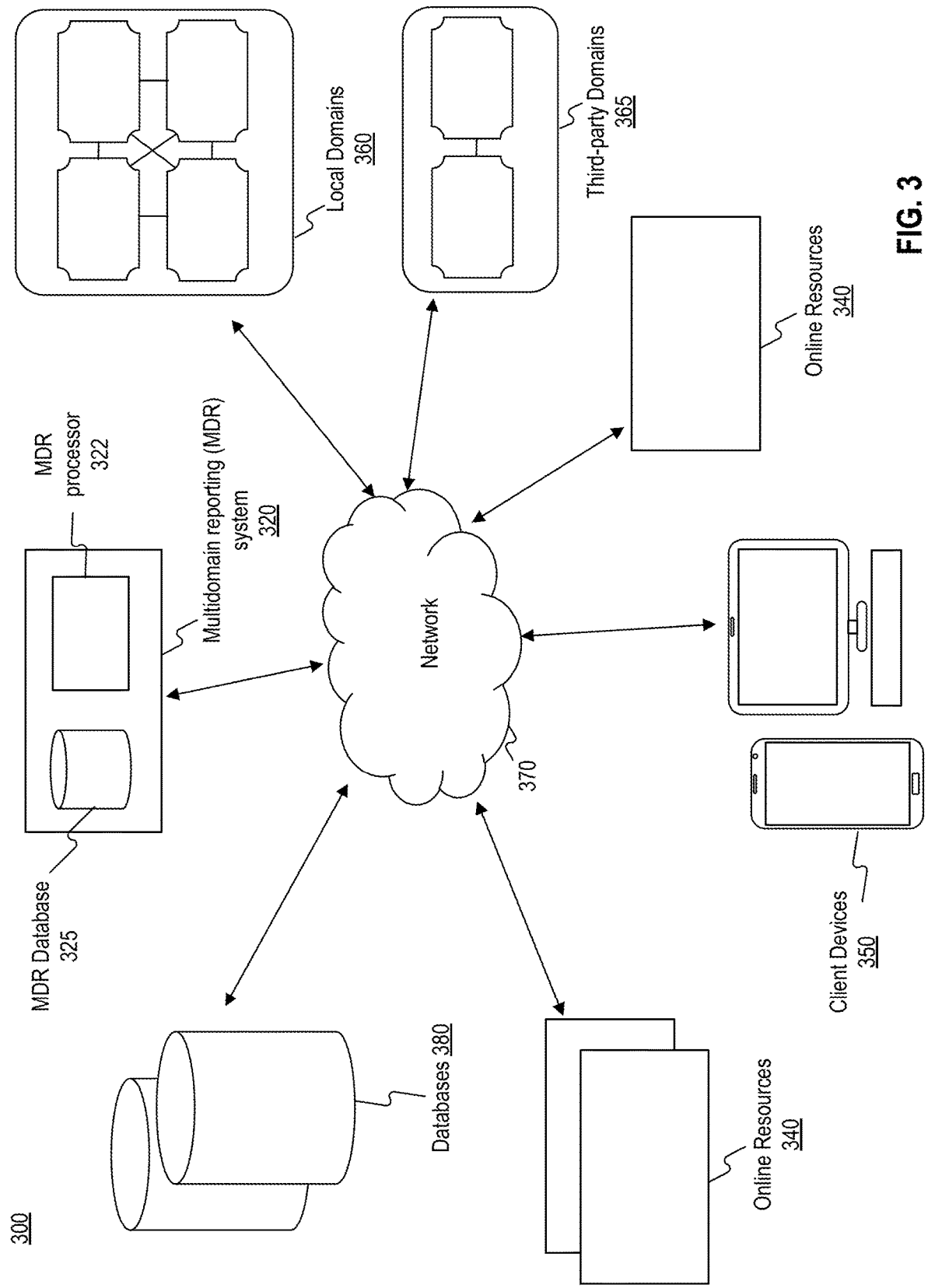
FIG. 3 is a schematic block diagram of an exemplary system, consistent with disclosed embodiments.

FIG. 3 is a block diagram of an exemplary system 300, consistent with disclosed embodiments. In system 300, a multidomain reporting (MDR) system 320 may include servers, computer modules, and/or data processing centers configured to process information requests from real-time client device's or domain's data streams. For example, MDR system 320 may collect and/or provide information about an order or ticket based on client or domain data. Further, MDR system 320 may track and provide information about orders or tickets that are being processed by domains, such as local domains 360 and third-party domains 365, to resolve status requests. MDR system 320 may also generate instructions to display webpages with status information and/or expose services for real-time monitoring of orders being process by system 300. Further, MDR system 320 may codify packets of information, generate instructions for GUI display in client devices, and sort and store information.

MDR system 320 may include MDR processors 322 which may analyze communications in system 300. Further, MDR system 320 may include an MDR database 325 that stores and manages in-memory data structures implementing a distributed in-memory key—value database. In such embodiments, MDR system 320 and MDR database 325 may support different kinds of abstract data structures, such as strings, lists, maps, sets, sorted sets, HyperLogLogs, bitmaps, streams, and spatial indexes. Moreover, in some embodiments MDR system 320 may include modules for stream-processing software providing a unified, high-throughput, low-latency modules for handling real-time data feeds (e.g., real time quests for information). In such embodiments, MDR system 320 may use TCP-based protocols for exchanges of information and message sets.

In some embodiments, MDR system 320 may be implemented with one or more of the components of system 100 (FIG. 1A). For example, MDR system 320 may be implemented with SAT system 101, external front-end system 103, FO system 113, SCM system 117, and/or WMS 119 (FIG. 1A). In other embodiments, MDR system 320 may be implemented with one or more independent servers configured to perform operations for providing content to client devices and/or generating webpages for client devices 350 and/or for display in local domains 360. MDR system 320, along with MDR processors 322 and MDR database 325, are further discussed in connection with FIG. 6.

System 300 may include, besides MDR system 320, online resources 340, client devices 350, third-party domains 365, local domains 360, and databases 380. In some embodiments, as shown in FIG. 3, components of system 300 may be connected to a network 370. However, in other embodiments components of system 300 may be connected directly with each other, without network 370. For example, databases 380 may be directly coupled to MDR system 320.

Online resources 340 may include one or more servers or storage services provided by an entity such as a provider of webpage hosting, networking, cloud, or backup services. In some embodiments, online resources 340 may be associated with hosting services or servers that store web pages for authentication services, Domain Name System (DNS), or landing pages. In other embodiments, online resources 340 may be associated with a cloud computing service. In yet other embodiments, online resources 340 may be associated with a messaging service, such as Apple Push Notification Service, Azure Mobile Services, or Google Cloud Messaging. In such embodiments, online resources 340 may handle the delivery of messages and notifications related to functions of the disclosed embodiments, such as handling digital rights management.

Client devices 350 may include one or more computing devices configured to perform one or more operations consistent with disclosed embodiments. For example, client devices 350 may include a desktop computer, a laptop, a server, a mobile device (e.g., tablet, smart phone, etc.), a set-top box, a gaming device, a wearable computing device, or other type of computing device. In some embodiments, client devices 350 may include the user devices 102A/102B (FIG. 1A) and be operated as part of system 100. In other embodiments, however, client devices 350 may be independent from system 100. Client devices 350 may include one or more processors configured to execute software instructions stored in memory, such as memory in client devices 350, to perform operations to implement the functions described below. For example, client devices 350 may be configured to display graphical user interfaces in webpages that include the status of orders or tickets provided by MDR system 320. Further, client devices 350 may be configured to perform operations according to instructions transmitted by MDR system 320, such as callback scripts or functions. Further, client devices 350 may be configured for wired and/or wireless communications and may include software that when executed by a processor performs internet-related communication (e.g., TCP/IP) and content display processes. For instance, client devices 350 may execute browser software that generates and displays interfaces with product information. Thus, client devices 350 may execute applications that allow client devices 350 to communicate with components over network 370 and display content in interfaces via display devices included in client devices 350.

In some embodiments, as further described below in connection to FIG. 4, client devices 350 may run applications specifically configured to interact with MDR system 320. Moreover, client devices 350 may store one or more accounts. For example, client devices 350 may store information about privileges of a customer account to modify PDDs and/or reroute packages.

The disclosed embodiments are not limited to any particular configuration of client devices 350. For instance, a client device 350 may be a mobile device that stores and executes mobile applications to perform operations that provide functions offered by MDR system 320 and/or online resources 340. In certain embodiments, client devices 350 may be configured to execute software instructions relating to location services, such as GPS locations. For example, client devices 350 may be configured to determine a geographic location and provide location data and time stamp data corresponding to the location data. Client devices 350 are further described in connection with FIG. 4.

Databases 380 may include one or more computing devices configured with appropriate software to perform operations consistent with providing MDR system 320 data for tracking orders or tickets in system 300. Databases 380 may include, for example, Oracle™ databases, Sybase™ databases, or other relational databases or non-relational databases, such as Hadoop™ sequence files, HBase™, or Cassandra™. Databases 380 may include computing components (e.g., database management system, database server, etc.) configured to receive and process requests for data stored in memory devices of the database(s) and to provide data from the database(s).

While databases 380 are shown separately, in some embodiments databases 380 may be included in, or otherwise related to MDR system 320 or online resources 340.

Databases 380 may be configured to collect and/or maintain data associated with user accounts or products to facilitate determination of available delivery options. For example, databases 380 may store information about user profiles for users of system 300. Further, databases 380 may store information about addresses, including delivery options available for the address. Databases 380 may collect the data from a variety of sources, including, for instance, online resources 340 or third-party domains 365. Further, databases 380 may include information about client devices 350 operating systems. Databases 380 are further described below in connection with FIG. 5.

Local domains 360 may include one or more elements of system 100. For example, local domains 360 may include SAT system 101, seller portal 109, FO system 113, and/or SCM system 117. Alternatively, or additionally, local domains 360 may include server and/or access points to local networks in system 300. For example, local domains 360 may include an order processing domain, purchase domain, inventory domain, security domain, and client-facing domains. These domains may be including local networks and networked resources to support fulfillment of client orders. Moreover, in some embodiments local domains 360 may include a monitoring engine domain or an administrator domain which may allow managers or administrators of multidomain networks to query MDR system 320 regarding the status of orders or tickets being processed throughout system 300. For example, local domains 360 may include a monitoring engine that periodically requests status updates regarding orders or tickets with predicted or actual delays. In such embodiments, local domains 360 may include a manager domain, such as a domain manager.

In some embodiments, third-party domains 365 may include one or more elements of system 100. For example, third-party domains 365 may include 3PL systems 121A-121C (FIG. 1). Additionally, or alternatively, third-party domains 365 may include one or more servers or storage services provided by an entity related to MDR system 320, such as a provider of services or a fulfillment center. third-party domains 365 may also be connected to system 300 via network 370, but in other embodiments third-party domains 365 may include direct connections with some elements of system 300. For example, to minimize delays or network congestion, third-party domains 365 may be connected in a private network with MDR system 320. Further, third-party domains 365 may be configured to provide and/or request information from MDR system 320, or other elements of system 300. In some embodiments, while third-party domains 365 may also be coupled to network 370, they may not be clients of MDR system 320. Instead, third-party domains 365 may include systems that include information of users or clients of MDR system 320. For example, third-party domains 365 may include servers of delivery contractors, which may be used by MDR system 320 when a product delivery involves a third-party contractor.

Network 370 may be any type of network configured to provide communications between components of system 300. For example, network 370 may be any type of network (including infrastructure) that provides communications, exchanges information, and/or facilitates the exchange of information, such as the Internet, a Local Area Network, near field communication (NFC), or other suitable connection(s) that enables the sending and receiving of information between the components of system 300. In other embodiments, one or more components of system 300 may communicate directly through a dedicated communication link(s). In yet other embodiments, network 370 may include multiple networks, organizing for example a network or networks.

It is to be understood that the configuration and boundaries of the functional building blocks of system 300 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope of the disclosed embodiments.

Figure 4:
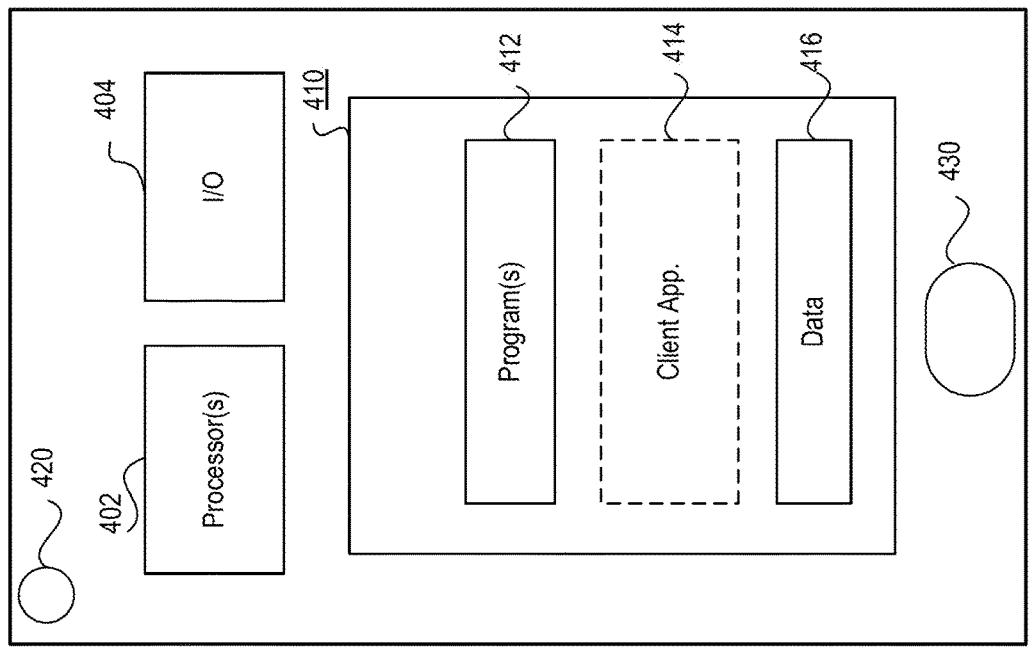
FIG. 4 is a block diagram of an exemplary client device, consistent with disclosed embodiments.

Referring now to FIG. 4, there is shown a block diagram of an exemplary client device 350 (FIG. 3), consistent with disclosed embodiments. In some embodiments, client devices 350 may implement user devices 102 (FIG. 1A).

In one embodiment, client devices 350 may include one or more processors 402, one or more input/output (I/O)

devices 404, and one or more memories 410. In some embodiments, client devices 350 may take the form of mobile computing devices such as smartphones or tablets, general purpose computers, or any combination of these components. Alternatively, client devices 350 (or systems including client devices 350) may be configured as a particular apparatus, embedded system, dedicated circuit based on the storage, execution, and/or implementation of the software instructions that perform one or more operations consistent with the disclosed embodiments. According to some embodiments, client devices 350 may include web browsers or similar computing devices that access web site consistent with disclosed embodiments.

Processor 402 may include one or more known processing devices, such as mobile device microprocessors manufactured by Intel™, NVIDIA™, or various processors from other manufacturers. The disclosed embodiments are not limited to any specific type of processor configured in client devices 350.

Memory 410 may include one or more storage devices configured to store instructions used by processor 402 to perform functions related to disclosed embodiments. For example, memory 410 may be configured with one or more software instructions, such as programs 412 that may perform operations when executed by processor 402. The disclosed embodiments are not limited to separate programs or computers configured to perform dedicated tasks. For example, memory 410 may include a single program 412 that performs the functions of the client devices 350, or program 412 may include multiple programs. Memory 410 may also include a client application 414 which may configure client devices 350 to communicate or execute operations to interact with other elements of system 300. For example, client application 414 may specify instructions to communicate with MDR system 320 and/or generate order information requests. In addition, client applications 414 may interpret instructions for generating graphical user interfaces (GUI) in client devices 350 or modifying displayed GUI. Moreover, client applications 414 may allow users to interact with MDR database 325 to perform operations like read, write, and/or collecting information for training a machine-learning model. Memory 410 may also store data 416 that may be used by MDR system 320 to generate and maintain status tables with information about the status of orders or products.

In certain embodiments, memory 410 may store instructions for accessing or sending requests to MDR system 320. For example, memory 410 may include an application that communicates with MDR system 320 via TCP/IP. Alternatively, or additionally, memory 410 may include information for communicating with MDR system 320 through application programming interface (API) methods. For example, in some embodiments MDR system 320 may expose REST API for services such as (1) creating a monitoring event entity, (2) updating a monitor entity, and (3) reporting missed state events. In such embodiments, memory 410 may store instructions to issue GET, PUT, DELETE, or POST instructions to request or send information to and from MDR system 320 using the exposed API services.

Moreover, other software components may be configured to request information from MDR system 320 or determine the location of client devices 350. For instance, software instructions in programs 412, when executed by processor(s) 402, may process information to display a list of items in a webpage. The software instructions may also implement scripts to modify webpages being displayed in client devices 350.

I/O devices 404 may include one or more devices configured to allow data to be received and/or transmitted by client devices 350 and to allow client devices 350 to communicate with other machines and devices, such as other components of system 300. For example, I/O devices 404 may include a screen for confirming delivery of a parcel or providing information to the user. I/O devices 404 may also include components for NFC communication. I/O devices 404 may also include one or more digital and/or analog devices that allow a user to interact with client devices 350 such as a touch-sensitive area, buttons, or microphones. I/O devices 404 may also include one or more accelerometers to detect the orientation and inertia of client devices 350. I/O devices 404 may also include other components known in the art for interacting with MDR system 320.

In some embodiments, client device 350 may also include a camera 420 that capture images and may be used for identification of a product. Such identification may trigger requests for content information for display. Additionally, or alternatively, client devices 350 may include a fingerprint sensor 430 that allows users to unlock client devices 350 to access their accounts, send request for information, and purchase items. Both camera 420 and fingerprint sensor 430 may be operated by processor 402 and use encryption security to make it impossible for users to externally access fingerprint or camera information.

The components of client devices 350 may be implemented in hardware, software, or a combination of both hardware and software, as will be apparent to those skilled in the art.

Figure 5:
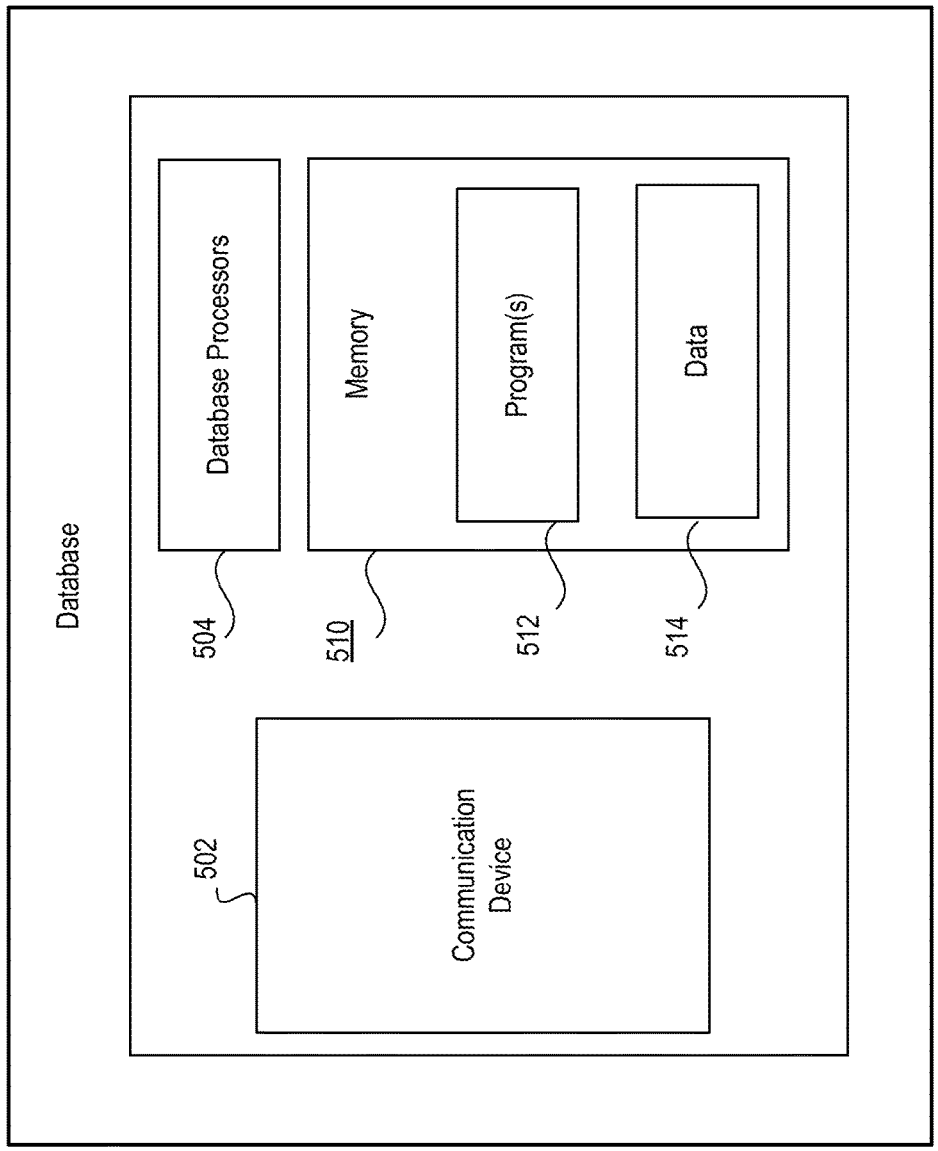
FIG. 5 is a block diagram of an exemplary database, consistent with disclosed embodiments.

Referring now to FIG. 5, there is shown a block diagram of an exemplary one of databases 380 (FIG. 3), consistent with disclosed embodiments. In some embodiments, databases 380 may be included in elements of system 100. For example, databases 380 may be part of external front-end system 103 or the WMS 119 (FIG. 1A).

Databases 380 may include a communication device 502, one or more database processors 504, and database memory 510 including one or more database programs 512 and data 514. Databases 380 may include NoSQL databases such as HBase, MongoDB™ or Cassandra™. Alternatively, databases 380 may include relational databases such as Oracle, MySQL and Microsoft SQL Server.

In some embodiments, databases 380 may be servers, general purpose computers, mainframe computers, or any combination of these components. In some embodiments, databases 380 are included within other elements of system 300, such as MDR system 320. Other implementations consistent with disclosed embodiments are possible.

In some embodiments, databases 380 may include both non-relational and embedded databases. For example, databases 380 may include a non-relational database, such as an Hbase, and an embedded database, such as a RocksDB (e.g., a key-value store database).

Communication device 502 may be configured to communicate with one or more components of system 300 or system 100, such as online resources 340, MDR system 320, or SCM system 117. Communication device 502 may be configured to provide MDR system 320 order information and user preferences or privileges.

The components of databases 380 may be implemented in hardware, software, or a combination of both hardware and software. For example, although one or more components of databases 380 may be implemented as computer processing instruction modules, all or a portion of the functionality of databases 380 may be implemented instead in dedicated electronics hardware.

Database memory 510 may include programs 512, which may include instructions to receive and process status messages from local domains 360 and third-party domains 365 and/or respond to information requests from client devices 350. Further, database memory 510 may include instructions for communications between elements of system 300. For example, database memory 510 may include instructions for communications between client devices 350 and MDR system 320. Further, programs 512 may include instructions to store information in real-time as it is processed by MDR system 320. In such embodiments, and as further disclosed in connection with FIG. 11, databases 380 may store a status table comprising: an ID field, an expected finish field, and a status field.

Data 514 may also be data associated with order status, expected delivery, and target PDD. Data 514 may include, for example, information relating to previously pending orders in the system, selected fulfillment centers, or inventory status. In some embodiments, data 514 may also the status table and database entry records.

Figure 6:
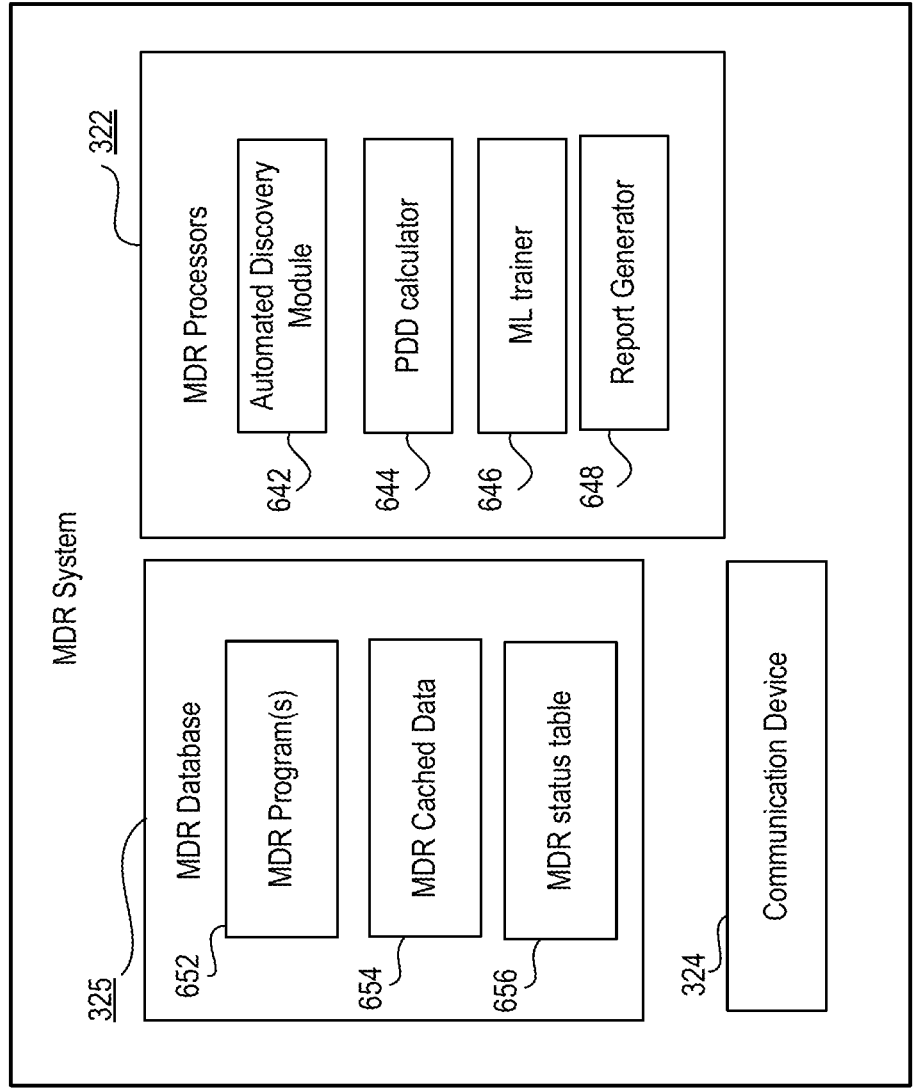
FIG. 6 is a block diagram of an exemplary multidomain reporting (MDR) system, consistent with disclosed embodiments.

FIG. 6 is a block diagram of an exemplary multidomain reporting (MDR) system 320 (FIG. 3), consistent with disclosed embodiments. MDR system 320 may include a communication device 324, MDR database 325, and one or more MDR processors 322. MDR database 325 may include MDR programs 652, MDR cached data 654, and MDR status table 656. MDR processors 322 may include an automated discovery module 642, a PDD calculator 644, a machine-learning (ML) trainer 646, and an report generator 648.

Communication device 324 may include a network controller and/or wireless adaptor for communicating over the Internet. Communication device 324 may be configured to communicate with one or more databases, such as databases 380 described (FIG. 3) either directly, or via network 170. Moreover, in some embodiments communication device 324 may be configurable to respond to REST API calls and/or queue based inputs. For example, communication device 310 may expose resources of MDR system 320 to request from local domains 360 and third-party domains 365 through REST API methods.

MDR database 325 includes one or more storage devices configured to store instructions used by MDR processors 322 to perform functions related to disclosed embodiments. For example, MDR database 325 may store software instructions that may perform operations when executed by MDR processors 322. The disclosed embodiments are not limited to separate programs or computers configured to perform dedicated tasks. Moreover, MDR database 325 may store data structures that allow centralized monitoring of the status of orders and/or tickets being process by system 300. For example, MDR database 325 may store an MDR status table 656 storing order entries (also known as monitoring entities) detailing order status. MDR status table 656 may include a unique ID for order entries (which may be codified based on item, vendor, and customer information) and a status of orders or tickets (which may include "Missed PDD," "Sent to Warehouse," among others). As further described in connection with FIG. 11, MDR status table 656 may include fields for order ID, entity type, current state, expected state, and uniform status. In some embodiments, MDR status table 656 may be configured to be accessible through queries or REST API calls.

Moreover, MDR database 325 may additionally include MDR cached data 654. MDR cached data 654 may include copies of certain entries in MDR status table 656 and/or requests being processed by MDR processors 322. MDR cached data 654 can also cache a copy of a processed report generated for a monitoring engine and transmit that copy when a monitoring engine requests it. In such embodiments, MDR cached data 654 can shorten the time required to retrieve a report from status table 656 if the report is large or accessed frequently.

In certain embodiments, MDR database 325, and particularly MDR programs 652, may store instructions for carrying out processes to generate status variables, calculate their PDD, and/or determine when an alert should be transmitted to administrator domains. Other instructions are possible as well. In general, instructions may be executed by MDR processors 322 to perform processes consistent with disclosed embodiments.

MDR processors 322 may include one or more known processing devices, such as, but not limited to, microprocessors, CPUs, and/or multi-core processors. In other embodiments, MDR processors 322 may be a plurality of devices coupled and configured to perform functions consistent with the disclosure. In some embodiments, MDR processors 322 may execute software to perform functions associated with each component of MDR processors 322. In other embodiments, each component of MDR processors 322 may be an independent device.

Automated discovery module 642 may be configured to crawl networks to identify new devices and/or domains and perform an automated discovery operation that couples them to the network and programs the devices or domains for automated operations. Automated discovery module 642 allows certain domains and devices to automate the steps necessary for recognition and communication with other devices on the same network or with MDR processors 322. In some embodiments, Automated discovery module 642 may be configured to automatically recognize domains or devices, identify communication methods, and configure certain tasks, such as transmitting update messages. For example, Automated discovery module 642 may automate steps necessary for a new domain to interact and communicate with MDR system 320 to transmit communications that populate MDR status table 656. In such embodiments, Automated discovery module 642 may assign an address to devices of a domain and broadcast it to inform other devices of system 300 of their identify and characteristics.

Moreover, Automated discovery module 642 may program domain devices program to automatically issue communications—such as API calls—to a centralized reporting systems such as MDR system 320. For example, Automated discovery module 642 may automate operations of assigning address to domains (or elements of domains), assign names for network interactions, and program API communications triggered by the culmination or the initiation of an event. In such embodiments, Automated discovery module 642 may configure devices of local domains 360 or third-party domains 365 to generate API calls or specific messages.

PDD calculator 644 may be configured to determine a promised delivery date (PDD) for an order or ticket being processed to populate entries in MDR status table 656. For example, once an order is received from one of client devices 350, PDD calculator 644 may identify and assign a fulfillment center or third party. Based on the assignment, PDD calculator 644 may then estimate a PDD or expected delivery that may be included in a field of MDR status table 656. While order fulfillment are processed through discontinued workflows in different domains, MDR processors 322 may compare current times with the estimate PDDs (generated by PDD calculator 644) to determine whether the system should generate an alert or expose certain API services to information administrator domains of delays. In some embodiments, as further discussed in connection with FIG. 15, PDD calculator 644 may use a series of rules to assign orders or tickets to specific fulfillment centers to then determine the estimated PDD and monitor the order status.

In some embodiments, PDD calculator 644 may be outside MDR system 320 and/or may be implemented by one or more elements of system 100. For example, in some embodiments PDD calculator 644 may be implemented as FO system 113 or SAR system 101 (FIG. 1) and transmit the PDD or expected delivery information to MDR system 320.

ML trainer 646 may be configured to use data in MDR database 325 to generate machine-learning (ML) models that predict order status and/or generate alerts. One advantage of implementing MDR system 320 is the ability to collect uniform and properly labeled data of multidomain networks. While in standard multidomain networks data may be segregated and difficult to normalize, the disclosed systems and methods for centralized status monitoring allow the collection and curation of data from the network. Such data may be utilized by ML trainer 646 to generate predictive models to manage multidomain networks. For example, ML trainer 646 may use data in MDR database 325 to train ML models that predict orders that will miss PDD or that will have delays. In such embodiments, ML trainer 646 may include programs (e.g., scripts, functions, algorithms) to train, implement, store, receive, retrieve, and/or transmit one or more ML models. The ML models may include a neural network model, an attention network model, a generative adversarial model (GAN), a recurrent neural network (RNN) model, a deep learning model (e.g., a long short-term memory (LSTM) model), a random forest model, a convolutional neural network (CNN) model, an RNN-CNN model, an LSTM-CNN model, a temporal-CNN model, a support vector machine (SVM) model, a Density-based spatial clustering of applications with noise (DBSCAN) model, a k-means clustering model, a distribution-based clustering model, a k-medoids model, a natural-language model, and/or another machine-learning model. Further, models may include an ensemble model (i.e., a model comprised of a plurality of models).

In some embodiments, ML trainer 646 may be configured to terminate training when a training criterion is satisfied. Training criterion may include several epochs, a training time, a performance metric (e.g., an estimate of accuracy in reproducing test data), or the like. ML trainer 646 may be configured to adjust model parameters during training. Model parameters may include weights, coefficients, offsets, or the like. Training may be supervised or unsupervised.

ML trainer 646 may be configured to train ML models by optimizing model parameters and/or hyperparameters (i.e., hyperparameter tuning) using an optimization technique, consistent with disclosed embodiments. Hyperparameters may include training hyperparameters, which may affect how training of a model occurs, or architectural hyperparameters, which may affect the structure of a model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. ML trainer 646 may be configured to optimize statistical models using known optimization techniques.

Report generator 648 may include hardware or software for the production of reports using data from MDR status table 656. For example, in response to certain API call from local domains 360 (FIG. 3), report generator 648 may be configured to identify entries in MDR status table 656 associated with a specific status and generate a report that may be broadcasted to an administrator domain. For example, through communication device 324 MDR system 320 may receive and API call from a monitoring engine in local domains 360 to generate a report of orders with missed PDD. In such scenarios, report generator 648 may identify entries in MDR status table 656 with a missed PDD status and generate a report that details the orders with missed PDD. As further discussed in connection with FIG. 17, in some embodiments the report may be an email or a text message that include the orders or tickets that match the category status requested by the monitoring engine.

Figure 7:
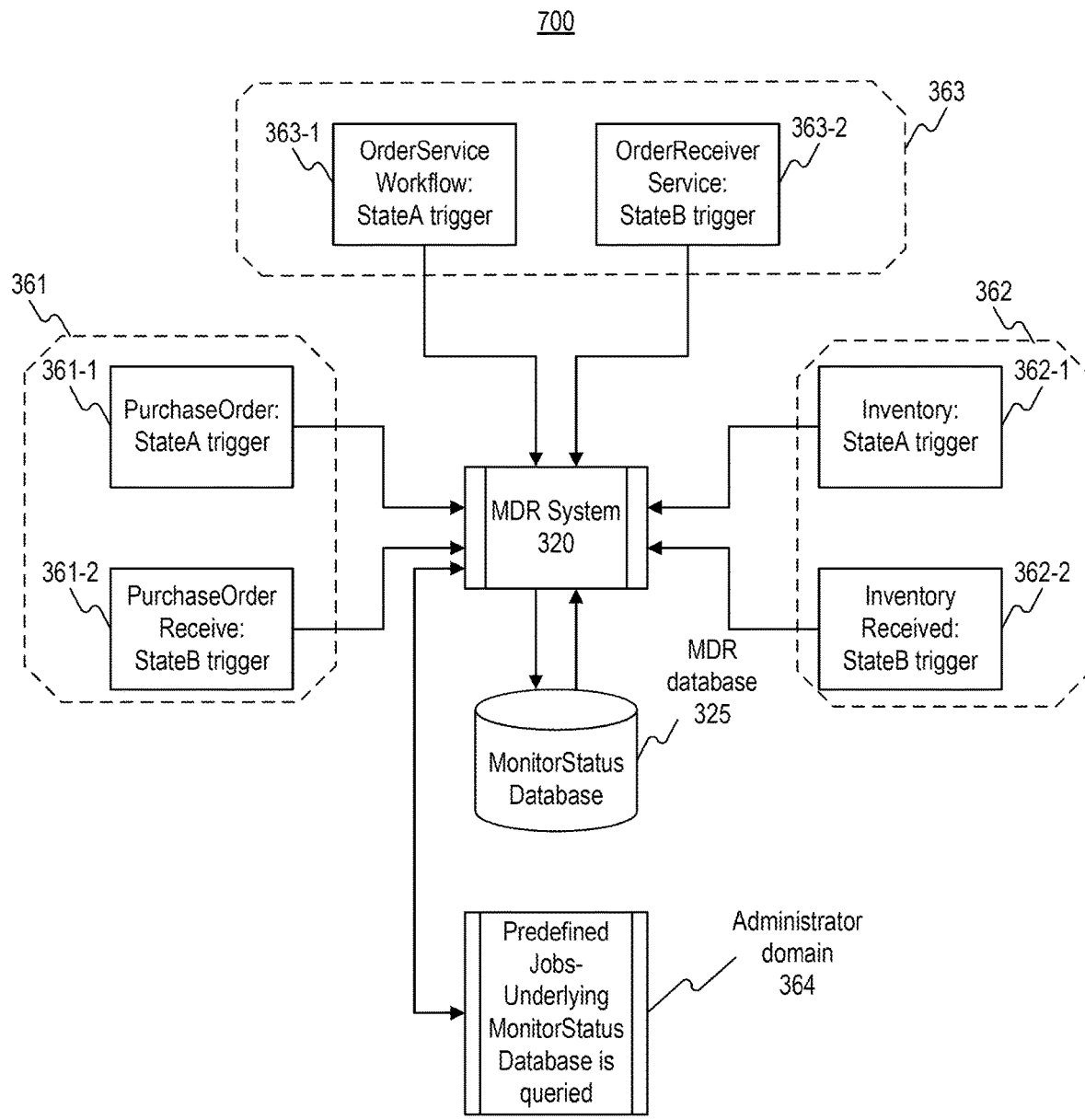
FIG. 7 is a block diagram of a multidomain network including MDR system, consistent with disclosed embodiments.

FIG. 7 is a block diagram of a multidomain network 700 including MDR system 320, consistent with disclosed embodiments. In addition to MDR system 320, network 700 includes order domain 363, inventory domain 362, and purchase domain 361. Each one of domains 361-363 may be part of local domains 360 (FIG. 3) and include systems dedicated to performing certain tasks during order fulfillment process. For example, order domain 363 may receive and process orders from client devices 350 (FIG. 3). Inventory domain 362 may maintain inventory availability for external front end system 103 (FIG. 1A) and assign fulfillment centers. And purchase domain 361 may process payments and settle transactions associated with orders. These are only exemplary local domains 360 and alternative or additional domains may be part of network 700. For example, domains in network 700 may include a security domain, an advertising domain, and/or a customer domain.

As previously discussed in connection with FIG. 6, MDR system 320 may communicate with MDR database 325 and with domains of network 700. As shown in FIG. 7, MDR system 320 may be directly connected with each one of order domain 363, inventory domain 362, and purchase domain 361, to generate a centralized monitoring system that monitors the status of orders or tickets during discontinued workflows. For example, using REST API methods and automated calls MDR system 320 may monitor orders or tickets in network 700. In such embodiments, order domain 363 may be configured to generate API calls or query request to create a monitor event entity for a new order received form a customer device. In some embodiments, this first API call or request may include an order ID that may be encoded based on an item type, a vendor, and an assigned FC. Additionally, inventory domain 362 may be configured to communicate updates with MDR system 320. For example, inventory domain 362 may be configured to generate a message or request updating the monitor entity created by order domain 363. This second update request may be triggered by orders being shipped from a warehouse. Moreover, purchase domain 361 may generate request to check for the status of orders to issue invoices once an order is shipped. In this way, MDR system 320 centralizes communications an allows each one of the domains to determine order status with simple requests that reduce network congestion. Such embodiments improve the technical field of multidomain management by eliminating the necessity of communicating the whole context across processes to identify a status. Instead, the disclosed configuration of network 700 allows the convergence of disconnected workflows in a single source with minimal necessary data.

As shown in FIG. 7, in some embodiments network 700 may also include an administrator domain 364. Administrator domain 364 may be associated with systems that have certain privileges over other domains of network 700. For example, systems in administrator domain 364 may have the ability to reroute, cancel, or update pricing of orders. In some embodiments, administrator domain 364 may include a monitoring engine that generates queries for MDR system 320 to generate status reports. For example, a monitoring engine in administrator domain 364 may issue API calls for MDR system 320 to request status reports on orders that (1) missed PDDs, (2) have been completed, or (3) have been shipped from a warehouse. In some embodiments, the monitoring engine may specify a status category as part of the API request. For example, the monitoring engine may include attributes in a REST API GET that specify the type of status that should be returned. Alternatively, or additionally, administrator domain 364 may coordinate predefined jobs for reporting and querying status tables in MDR database 325.

In certain embodiments MDR system 320 may only be available through administrator domain 364, to minimize security risks and have a tighter control of information in network 700. For example, REST API from MDR system 320 may only be exposed to communication from administrator domain 364.

Moreover as shown in FIG. 7, in certain embodiments each of local domains 360 may be subdivided in subdomains. For example, purchase domain 361 may be divided in a purchase service subdomain 361-1 and a purchase receiver subdomain 361-2. In such embodiments, MDR system 320 may be configurable to automatically associate messages from the subdomains with a specific status. For example, any message, regardless of payload from purchase service subdomain 361-1 may be associated with a "State A" while messages from purchase receiver subdomain 361-2 may be associated with a "State B." In such embodiments, messages from the domains with reduced payload may nonetheless trigger an update in a status of an order or monitoring entity in MDR system 320. Similarly, order domain 363 may be divided in an order service subdomain 363-1 and an order receiver subdomain 363-2, each associated with different triggers for updates to MDR system 320. Further, inventory domain 362 may also be divided in inventory service subdomain 362-1 and inventory receiver domain 362-2, having each subdomain being associated with specific triggering updates. The triggering updates may include transmitting updates to MDR database 325 through MDR system 320 using API calls.

Figure 8:
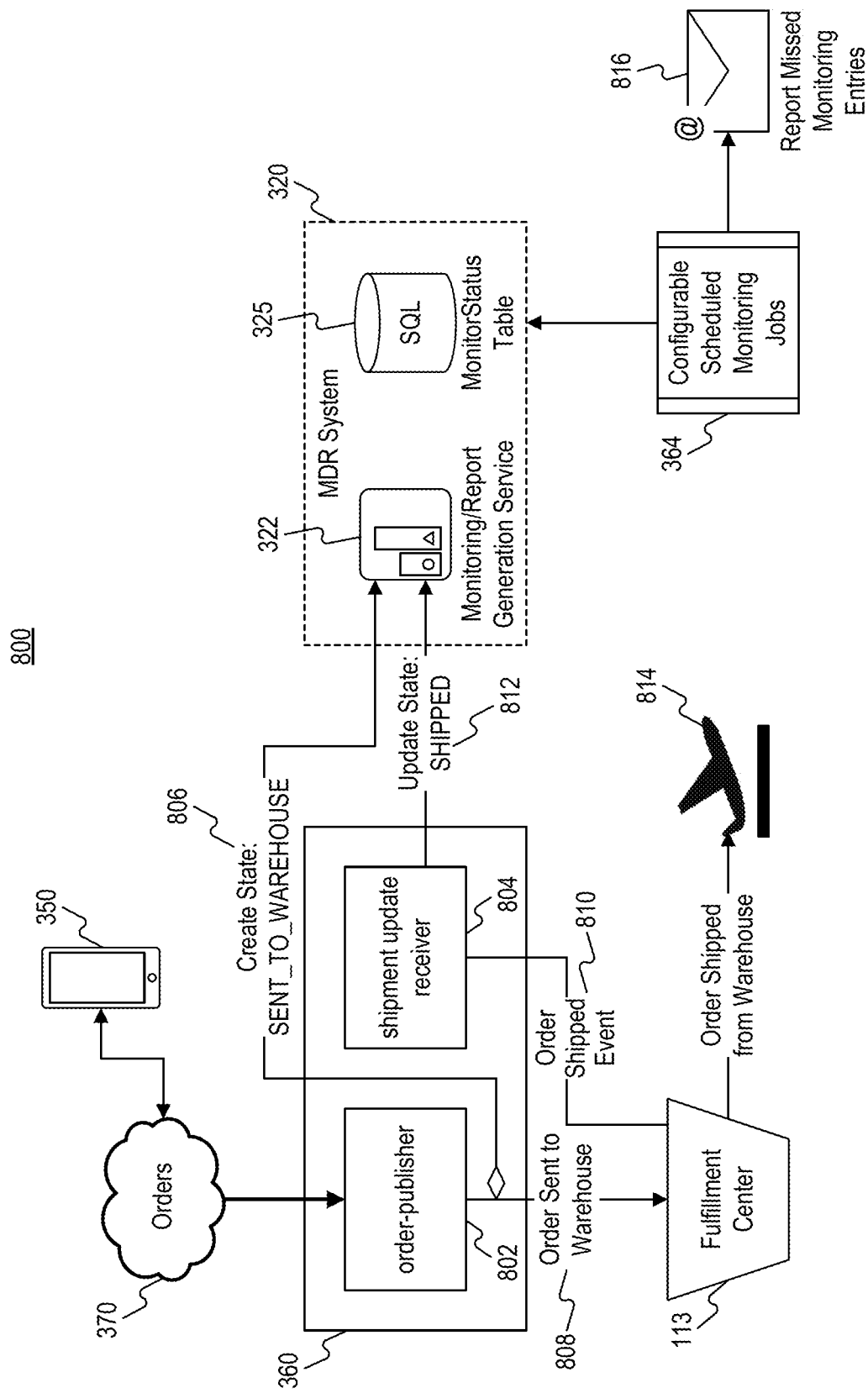
FIG. 8 is a flow diagram of an exemplary process for monitoring order shipments with an MDR service, consistent with disclosed embodiments.

FIG. 8 is a flow diagram of an exemplary process 800 for monitoring order shipments with MDR system 320 (FIG. 3), consistent with disclosed embodiments.

Process 800 may initiate when an order is placed on network 370 by one or more of client devices 350. For example, client devices 350 may place orders in a network to purchase items. In some embodiments, the order may be received through elements of system 100. For example, orders may be received from external front end system 103 (FIG. 1). The order may include information like shipping location and/or customer preferences.

The order may get relayed to local domains 360, such as order domain 363 (FIG. 6) that may receive and process the customer order. In some embodiments, as shown in FIG. 8, local domains 360 may include an order-publisher 802, which may be a server in local domains 360 in charge of processing client orders. For example, order-publisher 802 may be implemented as any of FO system 113, SAT system 101, and/or fulfilment messaging gateway 115. In certain embodiments order-publisher 802 may be implemented with SAT system 101 (FIG. 1) to process the order by identifying an FC, as further discussed in connection with FIG. 15. The order-publisher 802 may be in communication with additional local domains 360, such as inventory domain 362 and purchase domain 361.

As shown in FIG. 8, in some embodiments order-publisher 802 may be configured to generate a first message or call 806 for MDR system 320 to create a monitoring event entity. In some embodiments, the first message or call 806 may include an initial status of the order. For example, the first message or call 806 may specify a status for the order as sent to warehouse. Order-publisher 802 may be configured to send first message or call 806 automatically as soon the order is received and/or the order is sent to a warehouse. In some embodiments, as disclosed in connection with FIG. 6, local domains 360—e.g., order domain 363—may be configured to generate message or call 806 in an automated discovery operation.

In addition to sending first message or call 806, order-publisher 802 may transmit a second message or call 808 to a warehouse, which may be in a different one of local domains 360, such as a fulfillment center domain (e.g., second message or call 808 may get transmitted to FO system 113).

Once the warehouse or fulfillment center domain (such as FO system 113) ships from the warehouse at stage 814, fulfillment center domain may generate a third message or call 810 notifying one of local domains 360 that the order has been shipped. For example, a fulfillment center (FC) domain may transmit the third message or call 810 to a shipment domain which may include a shipment update receiver 804. Shipment update receiver 804 may then transmit a fourth message or call 812 to MDR system 320. The fourth message or call 812 may specify the order that is being monitored (through first message or call 806) has been shipped. In some embodiments, fourth message or call 812 may be transmitted through exposed REST API communication of MDR system 320 that update the monitoring entity, which may be implemented as one of the items in MDR status table 656. As MDR system 320 receives first message or call 806 and fourth message or call 812, MDR processors 322 may create entries in databases MDR database 325 and update the order states.

The above configuration of messages or calls from different domains in process 800, allows MDR system 320 to monitor discontinued workflows by converging events into a centralized source. Such configuration allows administrator domain 364 to generate real-time, periodic, and/or on-demand status requests of one or multiple orders being processed by system 300. Moreover, the disclosed configuration allows administrator domain 364 to monitor purchase orders and/or monitor inventory. Thus, process 800 may include configurable scheduled monitoring jobs to generate messages or calls to request status of orders that have been monitored in MDR database 325. For example, periodically (or on-demand) administrator domain 364 may generate report requests for MDR system 320. For example, MDR system 320 may generate a report for missed monitoring entries 816 that then gets communicated as a broadcasted email in administrator network 364.

As shown in FIG. 8, in some embodiments, administrator network 364 may include a configurable scheduled of monitoring jobs. For example, administrator network 364 may host servers and/or process that are configurable to generate status request with a user-configured periodicity. In some embodiments, the configurable scheduled monitoring jobs in administrator network 364 may generate the requests periodically based on user preferences that may be programmed in the configurable scheduled monitoring jobs. In some embodiments the configurable scheduled monitoring jobs may include automation software, scripting, and/or pipeline programming to query status table at a configurable period or interval (e.g., every day or every hour). For example, the configurable scheduling monitoring may program the status requests from orders in the MDR status table 656 (FIG. 6). Further, the configurable scheduled monitoring jobs may both request data from status tables and generate reports to desired receipts. In such embodiments, automation software may configure elements in administration network 364 to analyze and generate reports based on the information received in response to the job request. For example, when MDR status table 656 has orders and related promised delivery dates, administration network 364 may be configured to collect data from status table and then send a report to a warehouse. Alternatively, or additionally, the configurable scheduled monitoring jobs may program the generation and delivery of reports based on the status of orders, a reportion periodicity, and/or alerts.

In some embodiments, administrator network 364 may configure the scheduling jobs using a Jenkins job (e.g., pipeline as code or automation software) that queries the status table every interval unless there is an interruption. For example, administrator network 364 may configure a Jenkins job that runs every 24, 12, 6, or 3 hours etc. In such embodiments, the Jenkins job may perform the operations of request data from status table and the periodicity, or the conditions, for generating the reports.

Process 800 describes an exemplary use of MDR system 320 to monitor an order request and shipment for later reporting to administrator domain 364. However, process 800 may be adapted for different operations or disconnected workflows. For example, process 800 may be adapted for monitoring purchase orders and/or monitoring inventory.

Figure 9:
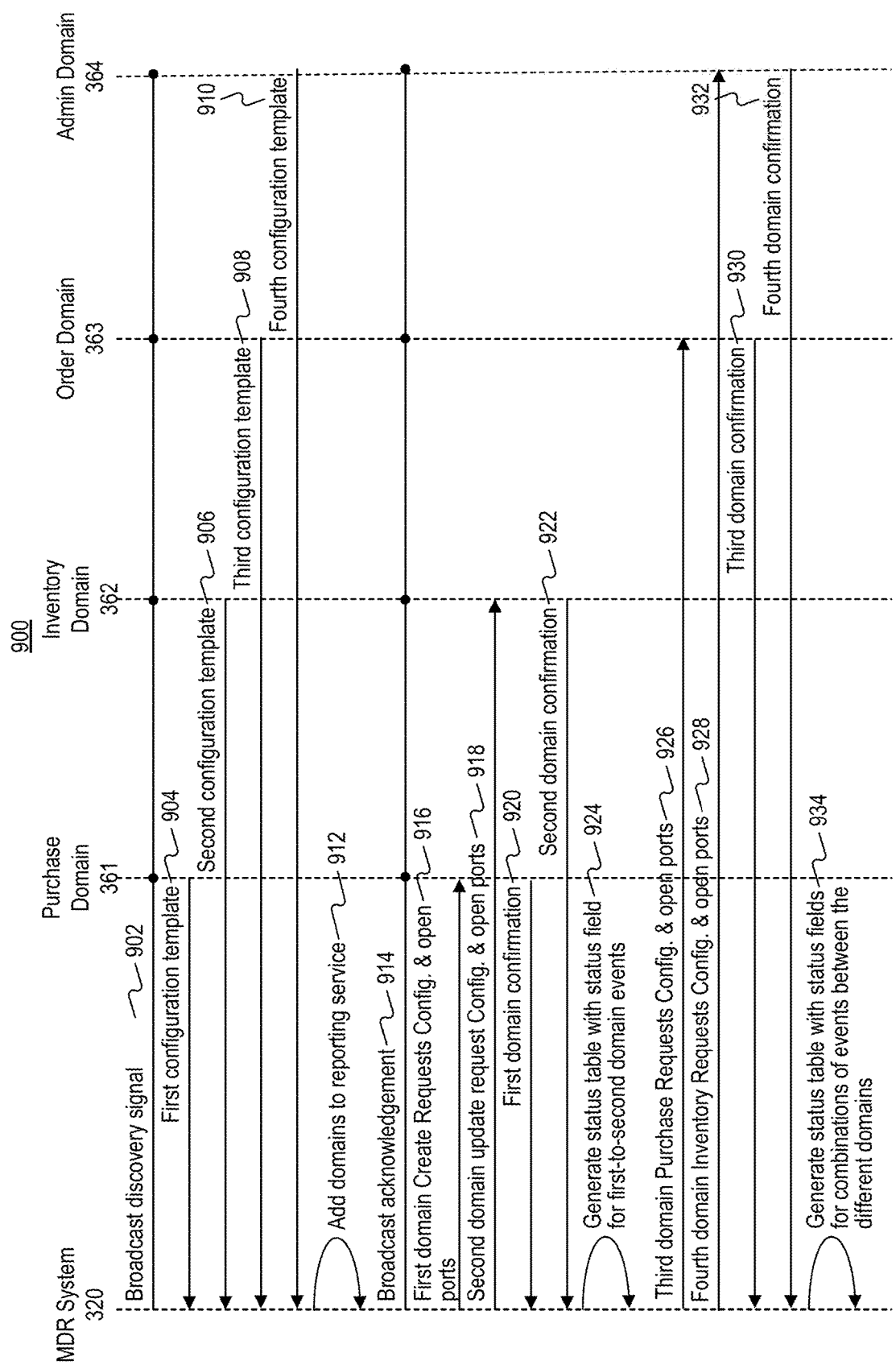
FIG. 9 is a timing diagram of an exemplary process flow for configuring communications with a plurality of domains in a multidomain network through an automated discovery operation, consistent with disclosed embodiments.

FIG. 9 is a timing diagram of an exemplary process flow 900 for configuring communication with a plurality of domains in a multidomain network through an automated discovery operation, consistent with disclosed embodiments.

In some embodiments, as shown in FIG. 9, different elements of system 300 (FIG. 3) and different local domains 360 may perform specific steps of process flow 900. For example, components of MDR system 320 may perform one or more steps of process flow 900 and local domains 360 (like purchase domain 361, inventory domain 362, order domain 363, and administrator domain 364) may perform additional steps of process flow 900. In other embodiments, however, alternative elements of system 300 may perform the described steps (e.g., databases 380 may perform certain steps) or a single element of system 300 may perform the described steps.

In step 902 MDR system 320 may broadcast a discovery signal. For example, MDR system 320 may generate a discovery signal to identify domains in the network and corresponding networked devices. In some embodiments, the discovery signal of step 920 may be a UDP broadcast signal broadcasting data packets to all IP addresses contained in the network. Alternatively, or additionally, the discovery signal of step 902 may include a TCP discovery signal. In some embodiments, the discovery signal may include operations to generate variables for each one of the domains in the multidomain network. For example, MDR system 320 may include operations such as new IPEndPoint (IPAddress.Any, 0), Server.Receive(ref ClientEp), and Encoding.ASCH.GetString(ClientRequestData).

In steps 904-910, local domains 360 may respond to the broadcast discovery requests with configuration templates. Purchase domain 361 may respond to the discovery request with first configuration template at step 904. The first configuration template being associated with the purchase domain 361. Inventory domain 362 may respond to the discovery request with second configuration template at step 906. The second configuration template being associated with the inventory domain 362. Similarly, order domain 363 may respond to the discovery request with third configuration template at step 908. The third configuration template being associated with the order domain 363. And administrator domain 364 may respond to the discovery request with fourth configuration template at step 910. The fourth configuration template being associated with the administrator domain 364.

The configuration templates may provide information of networked devices in local domains 360 and/or third-party domains 365. Further, configuration templates may indicate network topologies and available resources in the local domains 360. The configuration templates may also include programming instructions for certain devices within the network. The instructions may provide methods to program systems of the domains to generate inter-domain communications.

In step 912, MDR system 320 may add domains to the reporting services. For example, at step 912 MDR system 320 may include status for states associated with the local domains 360 and may expose itself to REST API requests from the discovered domains in step 902. Further at step 914 MDR system 320 may broadcast an acknowledgement to the added domains.

In steps 916 and 918, MDR system 320 may transmit configurations to local domains 360 to program automated interdomain communications that allow centralized monitoring of the disconnected workflows. For example, in step 916 MDR system 320 may transmit create request configurations to purchase domain 361 and open ports for automated communications. Similarly, in step 918 MDR system 320 may transmit update request configurations to inventory domain 362 and open ports for automated communications for order monitoring. In turn, local domains may respond with domain confirmations that networked elements have been configured for automated communications for order monitoring. For example, in step 920 purchase domain 361 may respond with a first domain conformation and in step 922 inventory domain 362 may respond with a second domain confirmation. Through steps 916-922, MDR system 320 may be able to setup an automated messaging system to create status and entries in MDR database 325 and generate a centralized monitoring system of the multidomain network with minimal exchange of data and low impact on bandwidth availability.

In some embodiments, MDR system 320 may perform a similar configuration for additional domains as part of process flow 900. For example in step 926 MDR system 320 may transmit purchase request configuration to order domain 363 and open ports for automated communication. In addition, in step 928 MDR system 320 may transmit an inventory request configuration to administrator domain 364 and open ports for automated communication. Order domain 363 and administrator domain 364 may respond to MDR system 320 with domain confirmations in steps 930 and 932 respectively.

In step 934, MDR system 320 may generate a status table, such as MDR status table 656, with status fields for combination of events between the discovered and connected domains of the multidomain network. For example, MDR system 320 may generate a status table that monitors the progress of orders through discontinued workflows using state variables and the automated communications to provide a centralized monitoring service.

In some embodiments, process flow 900 may allow MDR system 320 to configure multiple domains of a network for automated communications that generate the reporting system. For example, process flow 900 may allow MDR system 320 to couple with domains and expose REST API services for tracking orders through disconnected workflows.

Figure 10:
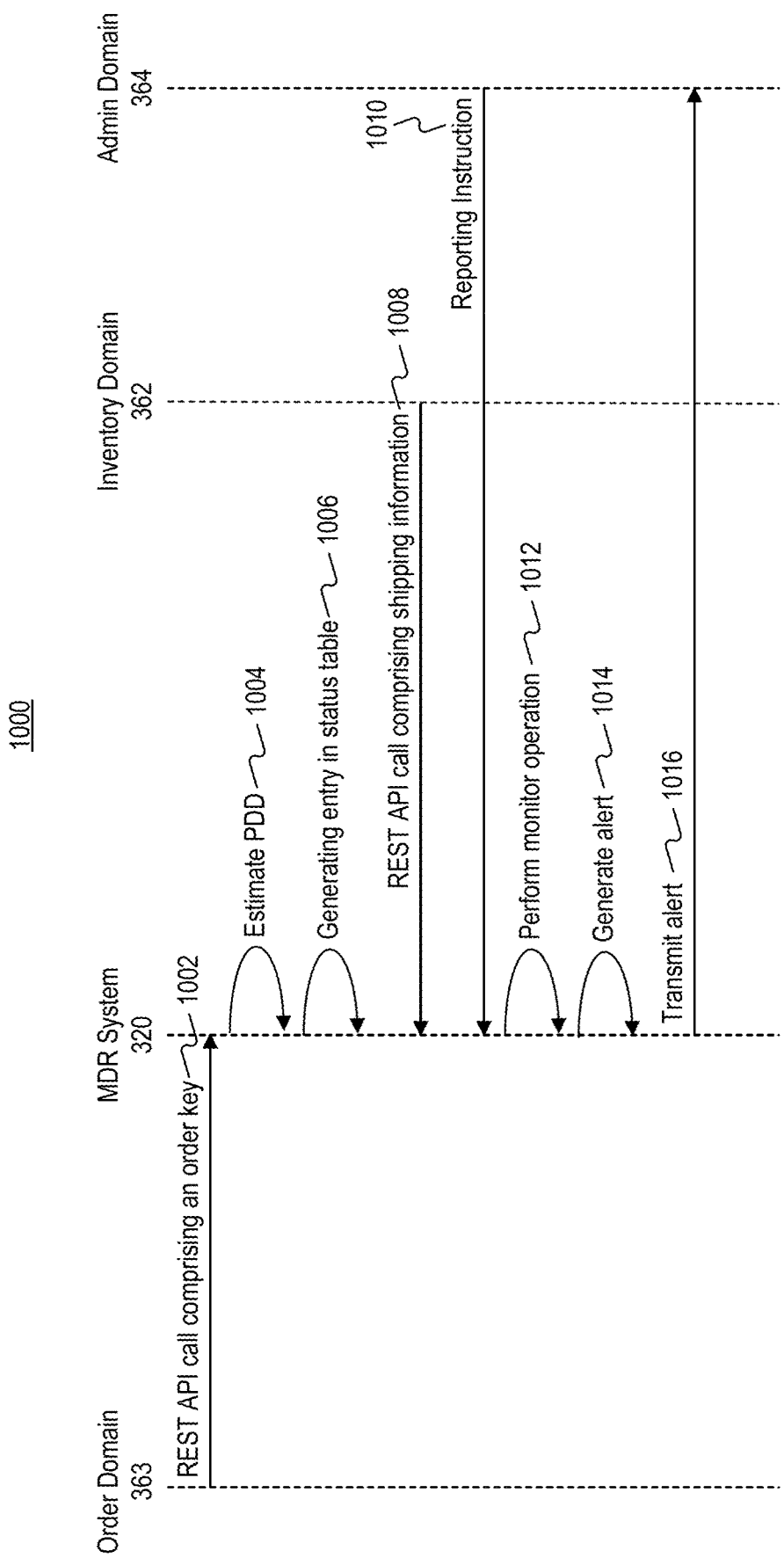
FIG. 10 is a timing diagram of an exemplary process flow for processing domains requests and generating alerts, consistent with disclosed embodiments.

FIG. 10 is a timing diagram of an exemplary process flow 1000 for processing domains requests and generating alerts, consistent with disclosed embodiments.

In some embodiments, as shown in FIG. 10, different elements of system 300 (FIG. 3) and different ones of local domains 360 may perform specific steps of process flow 1000. For example, components of MDR system 320 may perform one or more steps of process flow 1000 and local domains 360 (like order domain 363, inventory domain 362, and administrator domain 364) may perform additional steps of process flow 1000. In other embodiments, however, alternative elements of system 300 may perform the described steps (e.g., databases 380 may perform certain steps) or a single element of system 300 may perform the described steps.

In certain embodiments, process flow 1000 may be performed after process flow 900. For example, MDR system 320 may configure the multidomain network using process flow 900 and, after process flow 900 configuration, MDR system 320 may monitor the status of orders though process flow 1000.

In step 1002, order domain 363 may generate a REST API call comprising an order key. The order key may be encoded based on vendor and/or item. For example, depending on the type of order, an order can be routed to various vendors for getting it fulfilled. Each item in the order may be assigned a unique order key based on the vendor (e.g., ordered: 12345). This item within the order can be assigned to vendor JIKGU, vendor Ingram, Vendor EU_JIKGU, or others. So the order key for the order an item may be 12345, 12345 JIT_ING, or 12345 EU_JIKGU, codifying order, item and vendor. As shown in FIG. 10, the generated REST API call may be sent to MDR system 320.

In step 1004, MDR system 320 may estimate a PDD. For example, MDR system 320 may identify a specific vendor fulfillment center, warehouse, and/or third-party to correlate locations and/or previous deliveries to generate a PDD. As further described in connection with FIG. 15, determining a PDD may include the selection of a fulfillment center to—based on selection rules—estimate a PDD that can be used to monitor the status of orders. In some embodiments, the PDD may be based on the assigned vendor. For instance, orders processed by vendors in local domains 360 have a 2 day PDD while orders processed by third-party domains 365 may have a 7 day PDD.

In step 1006, MDR system 320 may generate an entry or monitoring entity in a status table. For example, MDR system 320 may generate an entry in MDR status table 656 in response to the REST API call of step 1002. In some embodiments, MDR system 320 may expose a REST API service for creating a monitoring event from new orders being processed by order domain 363.

In step 1008, MDR system 320 may receive a REST API call from inventory domain 362 including shipping information. For example, once the order is shipped from a warehouse to a courier, inventory domain 362 may transmit a message to MDR system 320 to update the status of the monitoring entity associated with the order. For instance, MDR system 320 may receive an update state of shipment when an order is shipped from a warehouse, like described in in connection with FIG. 8. In some embodiments, the configuration templates exchanged in process flow 900 (FIG. 9) may allow for automated transmission of the REST API call from inventory domain 362 to MDR system 320. In some embodiments, step 1008 may include calling exposed REST API services for updating monitoring entities from MDR system 320.

In some embodiments, the REST API call from inventory domain 362 may trigger a status change in MDR system 320. For example a status of an order may be modified from "SENT TO WAREHOUSE" to "SHIPPED" or from "MISSED PDD" to "COMPLETED."

In step 1010, administrator domain 364 may communicate with MDR system 320 to request a report. For example, a monitoring engine in administrator domain 364 may generate a request for a report with orders having a "MISSED PDD" status. Alternatively, or additionally, administrator domain 364 may generate requests for orders with a codified status. For instance, MDR system 320 may codify status of orders as (1) initiated, (2), failure, and (3) completed. In step 1010, administrator domain 364 may transmit the reporting instructions periodically (e.g., at the end of a business day) or on-demand, when an authorized user requests the report from MDR system 320.

In step 1012, MDR system 320 may perform a monitoring operation that complies with the reporting instruction of step 1010. For example, report generator 648 in MDR processors 322 (FIG. 6) may parse through MDR status table 656 to identify orders or tickets that match the reporting instructions of step 1010. In some embodiments, at step 1012 report generator 648 may identify orders that have a status of "MISSED PDD" or failure to prepare a report for a user in administrator domain 364.

In step 1014, MDR system 320 may generate an alert. For example, MDR system 320 may generate an email or text message including orders with a status that matches the reporting instructions. In step 1016, MDR system 320 may transmit the alert to administrator domain 364.

Process flow 1000 shows an example of how MDR system 320 can create a centralized monitoring system in multidomain networks. Even though order domain 363 and inventory domain 362 perform discontinued workflows without standardized communication, MDR system 320 allows managers of the multidomain network to monitor the status of order or tickets with simplified and automated communications. Thus, the implementation of and MDR system 320 improves the ability of managers to coordinate events in a multidomain network.

FIG. 11 is an exemplary status table 1100 for multidomain monitoring stored in a database, such as MDR database 325, consistent with disclosed embodiments. Status table 1100 includes a plurality of entries or monitoring entities 1102(*a*)-1102(*z*), collective referred to as monitoring entities 1102. Status table 1100 may associate each of the monitoring entities 1102 with a plurality of fields that may be used for centralized monitoring of the order or ticket status.

Literals used to reference individual elements in FIG. 11, e.g., (a), (b), or (z), do not specify the number of an element or the total number of elements in status table 1100. Instead, they are variable references that indicate a variable element number and a variable number of total elements. For example, literal (z) used to reference monitoring entity (z) does not indicate that monitoring entity (z)) is the $26^{th}$ memory unit. Instead, (z) is a variable reference that could indicate any integer number. Therefore, monitoring entity (z) is any one of monitoring entities 1102 or entries.

Fields of status table 1100 may include a field ID 1110, an entity type field 1112, an entity field 1114, and a current state field 1116. Field ID 1110 may store a unique primary key for each row. Alternatively, or additionally, field ID 1100 may store the order key encoded based on vendor and/or item, as further described in connection with FIG. 10. Entity type field 1112 may store a type of entity/use case that is being monitored (e.g., JIKGU_ORDER_MONITOR, INVENTORY_MONITOR, PURCHASE_MONITOR). Entity field 1114 may store the actual entity value that is being monitored (e.g., Actual orderID or 12345 JIT_ING). Further, current state field 1116 MAY store the state of entity monitoring (e.g., ORDER_SENT_TO_WAREHOUSE). Additionally, or alternatively, a value of current state field 1116 may be selected from a group including: null value, order sent to warehouse value, order shipped value, missed PDD value, or completed value.

Status table 1100 may also include an expected state field 1118, which may store an expected final state to which the entity needs to reach for it to complete (e.g., ORDER_SHIPPED). In some embodiments, expected state field 1118 may be populated based on results from machine-learning algorithms trained by ML trainer 646. For example, expected state field 1118 may store a predicted state for an order based on ML model outputs. Status table 1100 may also include an expected end time field 1122 that may also leverage ML models to populate fields in status table 1100. Alternatively, or additionally, expected end time field 1122 may store the expected end time at which an expected state, stored in expected state field 1118, that should be reached.

Status table 1100 may additionally include fields that monitor time at different stages in a multidomain network. For example, status table 1100 may include a start time field 1120, storing the actual start time at which current state field 1116 was updated, and an end time field 1124, which may store the actual end time at which the state stored in expected state field 1116 should be reached.

Status table 1100 may also include codified status for monitoring entities 1102. For example, MDR system 320 may generate a code for each one of the monitoring entities 1102 based on the combination of the fields in status table 1100. Status table 1100 may include a status field 1126 that stores a codified variable encoding the status of the order or ticket associated with monitoring entities 1102. For example, status field 1126 may store an integer variable where "1" codifies initiated order, "2" codifies a failure to meet PDD, and "3" codifies a completed order. Moreover, in certain embodiments status field 1126 may store values from a group including: null value, order sent to warehouse value, order shipped value, missed PDD value, or completed value.

Figure 12:
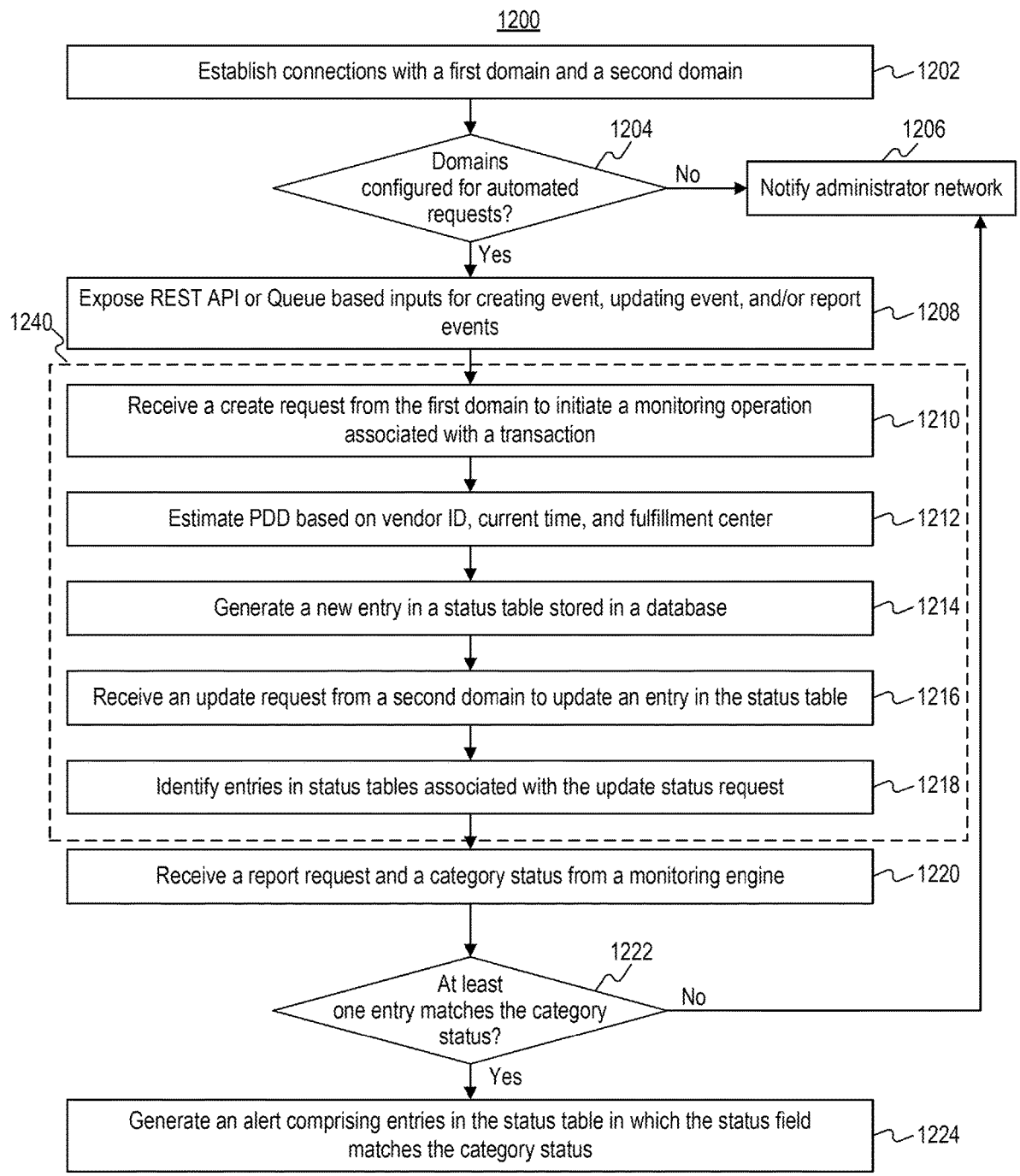
FIG. 12 is a flow chart of an exemplary process for multidomain status monitoring, consistent with disclosed embodiments.

FIG. 12 is a flow chart of an exemplary process 1200 for multidomain status monitoring, consistent with disclosed embodiments. In some embodiments, elements of system 300 may perform process 1200. For example, as disclosed in the steps description below, MDR system 320 may perform process 1200. Alternatively, or additionally, local domains 360 may perform process 1200, or parts of process 1200. Further, in other embodiments system 100, or parts of system 100, may perform process 1200. For instance, SAT system 101 and/or FMG 115 may perform process 1200.

In step 1202, MDR system 320 may establish connections with a first domain and a second domain. For example MDR system 320 may establish connections with local domains 360 and/or third-party domains 365 through an automated discovery operation using MDR processors 322 or communication device 324. In some embodiments, the first domain includes an order reception domain and the second domain is an order shipment domain. In such embodiments, 1202 MDR system 320 may establish connection with the second domain by opening one or more ports in a shipment update receiver in step 1202.

In step 1204, MDR system 320 may determine whether domains have been configured for automated requests. For example, MDR system 320 may review confirmations from systems (as discussed in connection with FIG. 9) to determine if the discovered domains have been configured for automated communication or API calls triggered by service or receive events associated with an order or ticket. If MDR system 320 determines that domains have not been configured for automated requests (step 1204: no), MDR system 320 may notify to an administrator network in step 1206. For example, in step 1206 MDR system 320 may broadcast a message to administrator network 364 indicating that one or more domains in the network are not configured.

However, if MDR system 320 determines that domains have been configured for automated requests (step 1204: yes), MDR system 320 may continue to step 1208. In step 1208, MDR system may expose REST API or Queue based services for creating order status events, updating order status events, and/or reporting order status events. For example, when the domains have been configured for automated requests, MDR system 320 may expose a REST API for creating one of monitoring entities 1102, updating the monitoring entity (e.g., through a REST API call), and receiving and handling reports requests.

In step 1210, MDR system 320 may receive a create request from the first domain to initiate a monitoring operation associated with a transaction. For example, as further discussed in connection with FIG. 10, one of local domains 360 may generate a create request associated with an order received from one of client devices 350. In some embodiments, the first request comprises a first REST API call comprising an order key, where the order key encodes an item ID and a vendor ID.

In some embodiments, MDR system 320 may automatically generate entries in status table 1100 in response to receiving a create request from the first domain in step 1210. In such embodiments, MDR system 320 may generate new entries in status table 1100 by estimating a value of the expected finish field based on the vendor ID, a current time, and a start time.

In step 1212, MDR system 320 may estimate a PDD based on vendor ID, current time, and a fulfillment center. For example, MDR system 320 may identify a selected fulfillment center for the order and a vendor from an order key associated with the create request and determine a PDD. In some embodiments, as further discussed in connection with FIG. 15, the determination of the PDD may be based on rules for fulfillment center selection, the type of item, and/or whether local or third-party domains handle the fulfilment request.

In step 1214, MDR system 320 may generate a new entry or monitoring entity in a status table stored in a database. For example, MDR system 320 may generate one of monitoring entities 1102 in status table 1100 stored in MDR database 325. In some embodiments, in step 1214 MDR system 320 may populate field of status table 1100. For example, MDR system 320 may employ ML models to determine expected status and expected end time to populate fields of status table 1100.

In step 1216, MDR system 320 may receive an update request from a second domain to update an entry in the status table. For example, as discussed in connection with FIG. 10, MDR system 320 may receive an update request through an API call from a second domain different from the first domain. The second domain may be a shipping domain while the first domain may be an orders domain. The second request may specify a status of the order or transmit a specific message such as "SHIPPED" state, as discussed in FIG. 9. Moreover, in some embodiments the second request may include a second REST API call comprising shipment information.

In step 1218, MDR system 320 may identify one or more entries in status tables associated with the update status request of step 1216. For example, MDR system 320 may associate the update request with one of monitoring entities 1102 in status table 1100. In some embodiments, MDR process 322 in MDR system 320 may correlate Field ID 1110 of monitoring entities 1102 with an ID of the update request to identify which entry in status table 1100 should be updated.

In some embodiments, steps 1210-1218 may get repeated in a cycle 1240 as new orders get received and processed by systems of a multidomain network. For example, steps 1210 may get repeated every time a new order or ticket is received by customer-facing elements of the network. In this way, it is possible to generate automated centralized monitoring systems administered by MDR system 320 that allow network managers to monitor the status of orders without having to pass full contextual information across domains. Monitoring orders using cycle 120 enables MDR system 320 to converge statuses into a single source with minimal necessary data. Such configuration improves the technical field of multidomain networks by creating monitoring systems with reduced bandwidth consumption.

The monitoring stages of process 1200 in cycle 1240 may prepare a status table, such as status table 1100, that may be queried by managers to identify the status of orders or tickets in the multidomain network. In step 1220 MDR system 320 may receive a report request and a category status from a monitoring engine. For example, as discussed in connection with FIG. 10, a monitoring engine in administrator domain 364 may periodically generate a request for report with orders having a category status of "MISSED PDD." In some embodiments, the category status received in step 1220 may specify the category of monitoring entities 1102 that should be reported. For example, a manager of a network may specify which fields should be reported in the request of step 1220. In some embodiments, the status request may include at least one of missed PDD or null end time. Further, the monitoring engine in administrator domain 364 may be configured to generate the report request at least once a day and/or with a configurable frequency.

In step 1222, MDR system 320 may determine whether at least one entry in the status table match the category status in the request status of step 1220. For example, when the report request includes a status category of 'MISSED PDD,' MDR system 320 may determine whether at least one of the monitoring entities 1102 has a current state field of 'MISSED PDD.' If MDR system 320 determines that none of the entries match the category status (step 1222: no), MDR system 320 may continue to step 1206 and notify the administrator network by, for example, issuing a broadcast message. However, if MDR system 320 determines that at least one of the entries match the category status (step 1222: yes), MDR system 320 may continue to step 1224.

In step 1224, MDR system 320 may generate an alert comprising entries in the status table in which the status field matches the category status. For example, MDR processors 322 may employ report generator 648 to generate a report that includes monitoring entities 1102 that have matching fields to the category status. As further discussed in connection with FIG. 17, the alert may be broadcasted as an automated email or a text message, which may be deployed to administrator domain 364. In some embodiments, generating the alert in step 1224 may include broadcasting an email message to an administrator network.

Figure 13:
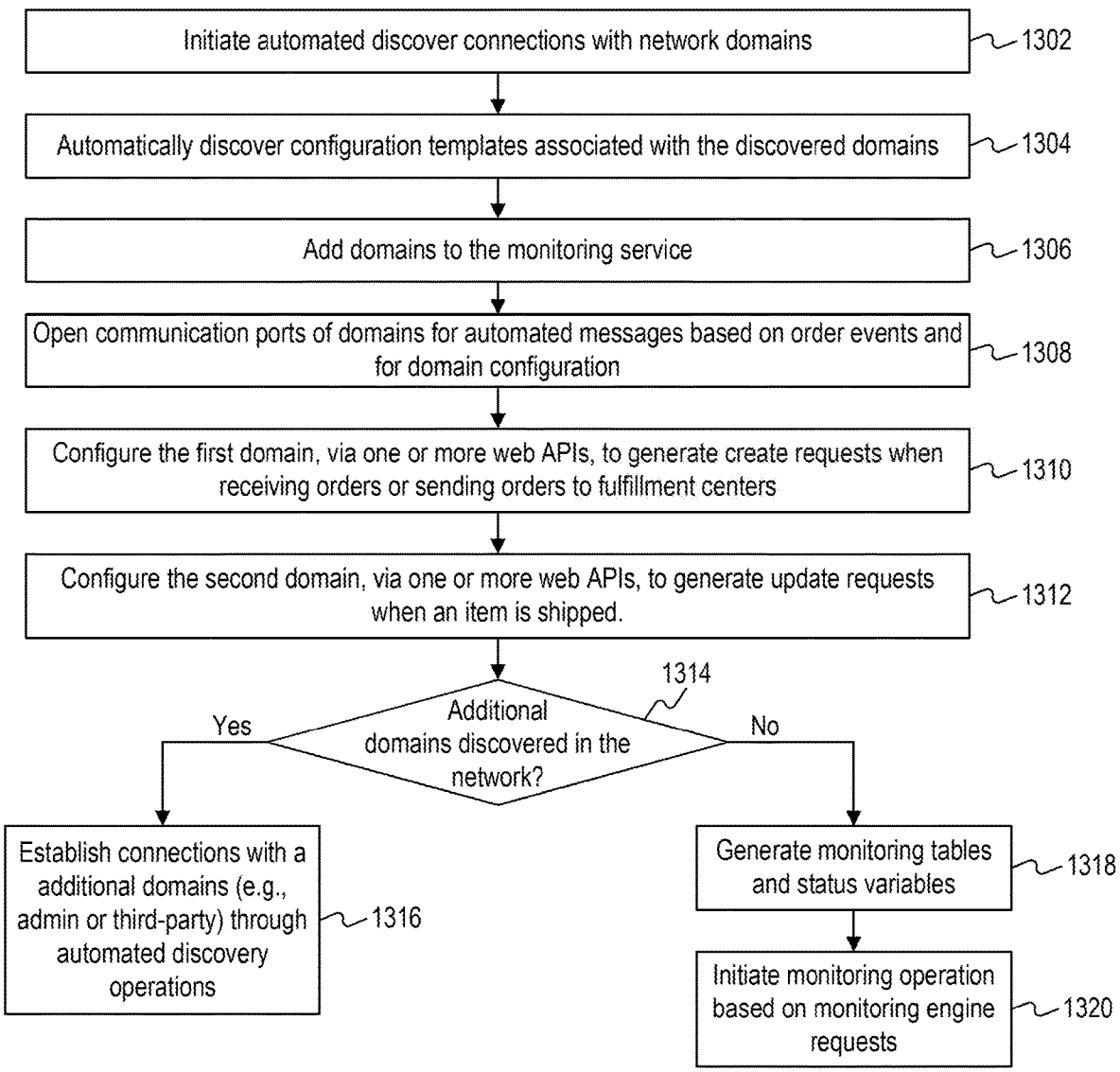
FIG. 13 is a flow chart of an exemplary process for establishing multidomain communications through automated discovery connections, consistent with disclosed embodiments.

FIG. 13 is a flow chart of an exemplary process 1300 for establishing multidomain communications through automated discovery connections, consistent with disclosed embodiments.

In some embodiments, elements of system 300 may perform process 1300. For example, as disclosed in the steps description below, MDR system 320 may perform process 1300. Alternatively, or additionally, databases 380, local domains 360, or third-party domains 365 may perform process 1300, or parts of process 1300. Further, in other embodiments system 100, or parts of system 100, may perform process 1300. For instance, external front-end system 103 and/or FMG 115 may perform process 1300.

In step 1302, MDR system 320 may initiate automated discovery connections with network domains. For example, MDR system 320 may initiate Automated discovery module 642 to establish the automated interdomain communications that allow centralized monitoring of order or ticket status. In step 1304, MDR system 320 may automatically discover configuration templates associated with discovered domains. As discussed in connection with FIG. 9, MDR system 320 may broadcast a discovery and receive configuration templates from domains in the multidomain network.

In step 1306, MDR system 320 may add domains to the monitoring service. For example, MDR system 320 may add fields to status table 1100 (FIG. 11) to reflect the number and relationships between the discovered domains. Further, in step 1306 MDR system 320 may generate methods to query for statuses associated with the discovered domains. In step 1308, MDR system 320 may open communication ports of domains for automated messages based on order events and for domain configuration. For instance, in some embodiments MDR system 320 may open TCP or UDP ports at local domains 360 for reporting stream feeds that enable real-time monitoring of order or ticket status in multidomain systems.

In step 1310, MDR system 320 may configure a first domain, via one or more web APIs, to generate create requests when receiving orders or sending orders to fulfillment centers. For example, MDR system 320 may configure order domain 363 to send a create request every time a new order is received from client devices 350. In step 1312, MDR system 320 may configure a second domain, via one or more web APIs, to generate update requests when an item is shipped. For example, MDR system 320 may configure inventory domain 362 to send an update request every time an order is shipped from a warehouse. Alternatively, or additionally, steps 1310-1312 may include configuring the first domain, via one or more web APIs associated with the first domain, to generate create requests when new orders are received or orders are sent to fulfillment centers, and configuring the second domain, via one or more web APIs associated with the second domain, to generate update requests when an item is shipped.

In step 1314, MDR system 320 may determine whether additional domains have been discovered in the network. If MDR system 320 determines that additional domains have been discovered in the network (step 1314: yes), MDR system 320 may continue to step 1316 and establish connections with additional domains. For example, in step 1316 MDR system 320 may establish connections with administrator domain 364 or third-party domains 365. Alternatively, or additionally, in step 1316 MDR system 320 may establish connections with a third domain and a fourth domain by performing the automated discovery operation (like the one described in connection with FIG. 9), where the third domain is an inventory domain and the fourth domain is a third-party domain.

However, if MDR system 320 determines that additional domains have not been discovered in the network (step 1314: no), MDR system 320 may continue to step 1318 and generate monitoring tables and status variables. For example, in step 1318 MDR system 320 may select which and the number of fields in MDR status table 656. Further, MDR system 320 may codify the possible variables and sequence of variables in the fields of MDR status table 656. For example, MDR system 320 may determine which variables will encode the status field 1126 or the sequence of current state 1116 that may be expected, which may include a sequence of "ORDER_SENT_TO_WAREHOUSE," "ORDER_SHIPPED," "ORDERS_MISSED_PDD," and "COMPLETED_ORDER."

In step 1320, MDR system 320 may initiate monitoring operation based on monitoring engine requests. For example, as discussed in connection with FIGS. 10 and 12, a monitoring engine in administrator domain 364 may send reporting instructions to MDR system 320. In response, MDR system 320 may perform a monitoring operation by parsing monitoring entities 1102 in status table 1100 and prepare a report with orders or tickets that match the reporting instructions. In some embodiments, the monitoring operation may include assigning the missed PDD value to entries in the status table based on comparing expected finish field with current time and identifying entries in the status table where the value of the state field is at least one of the null value or the missed PDD value. Additionally, or alternatively, certain embodiments of the disclosed systems may have the monitoring operation being performed through an automation server. The automation server may enable programmed manipulation of networked objects or exposing networked objects so they can be manipulated. For example, the automation server may run applications that expose programmable objects (called automation objects) to other applications (called automation clients). In some embodiments, exposing automation objects may enable clients to automate certain procedures by directly accessing the objects and functionality the server makes available. Exposing objects this way may be beneficial when applications provide functionality that is useful for other applications. Moreover, automation objects may have properties and methods as their external interface. Properties are named attributes of the automation object.

Figure 14:
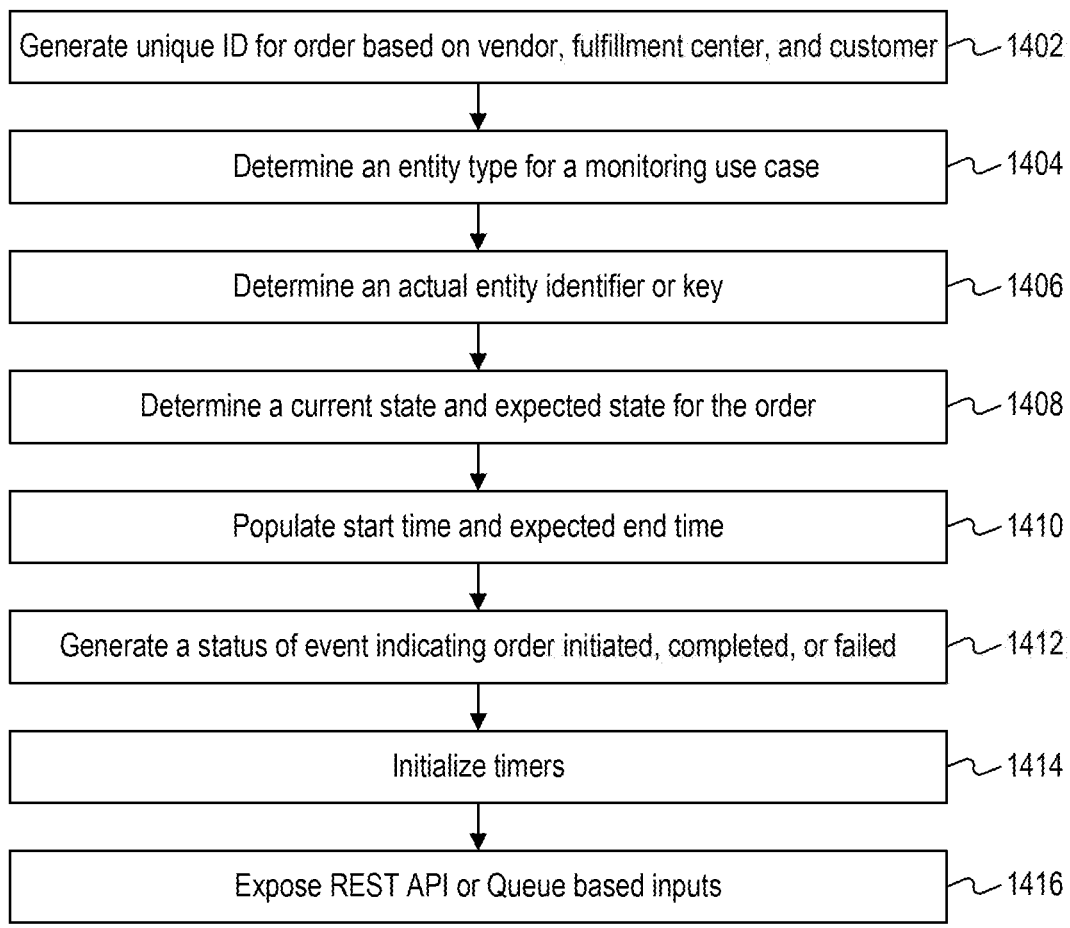
FIG. 14 is a flow chart of an exemplary process for managing monitoring entities in a multidomain status table, consistent with disclosed embodiments.

FIG. 14 is a flow chart of an exemplary process 1400 for managing entries in a multidomain status table, consistent with disclosed embodiments. For example, process 1400 may be used to populate MDR status table 656.

In some embodiments, elements of system 300 may perform process 1400. For example, as disclosed in the steps description below, MDR system 320 may perform process 1400. Alternatively, or additionally, elements of local domains 360 or database 380 may perform process 1400, or parts of process 1400. Further, in other embodiments system 100, or parts of system 100, may perform process 1400.

In step 1402, MDR system 320 may generate unique IDs for orders based on vendor, fulfillment center, and customer. For example MDR system 320 may codify an order key based on vendor, item, and customer, as further discussed in connection with FIG. 10.

In step 1404, MDR system 320 may determine an entity type for a monitoring use case. For example, MDR system 320 may determine whether the order or ticket is associated with shipping a product to a customer, or whether it is an entity type for sourcing a product from a third party.

In step 1406, MDR system 320 may determine an actual entity identifier or key. For example, MDR system 320 may determine an order ID for a status table that allows MDR system 320 to associated update requests with the order.

In step 1408, MDR system 320 may determine a current state and expected state for the order. For example, MDR system 320 may determine an initial state in which an entity starts (e.g., ORDER_SENT_TO_WAREHOUSE) and an expected state when receiving the following update (e.g., ORDER_SHIPPED).

In step 1410 MDR system 320 may populate a start time and an expected end time, which may be based on an estimated PDD. In step 1412, MDR system 320 may generate a status of event indicating an order has been initiated, completed, or failed. In some embodiments, the status of event may be codified to minimize payload of communication exchanges or facilitate searching or filtering algorithms during monitoring operations. In step 1414, MDR system 320 may initialize timers to initiate centralized reporting of order status.

In step 1416, MDR system 320 may expose REST API or queue based inputs to service domains when request status of order or tickets tracked by MDR system 320. Step 1416 may include identifying resources of MDR system 320 that will be exposed by an API module, identify entities that will be interfacing with the exposed resources, and determine interactions with the API to develop the necessary use cases.

Step 1416 may also include identifying respective locations of resources that will be exposed through REST API and assign URIs and the respective methods where the resources they expose can be accessed. In some embodiments, URIs are essentially paths, and can be contextual to the scenarios. Moreover, the Expose REST API inputs, MDR system 320 may associate a particular HTTP method to each one of these paths, where each method has a particular meaning. The HTTP methods may include: GET, POST, PUT, and/or DELETE.

In some embodiments, exposing REST API or queue based inputs of step 1416 may include implementing client-side front-end technologies based on JavaScript to create and parse data in this JSON format. For example, MDR system 320 may implement interfaces such as JsonViewer, JsonCreator, JsonUpdater, and JsonAdapter. Additionally, or alternatively, MDR system 320 may be configured to identify endpoints in the exposed resources and produce JSON responses to invocations on those endpoints. These configurations and exposure of MDR system 320 (such as MDR database 325) allows local domains 360 and third-party domains 365 to produce messages that populate the status tables for centralized monitoring and also allow domains to query resources of MDR system 320.

Figure 15:
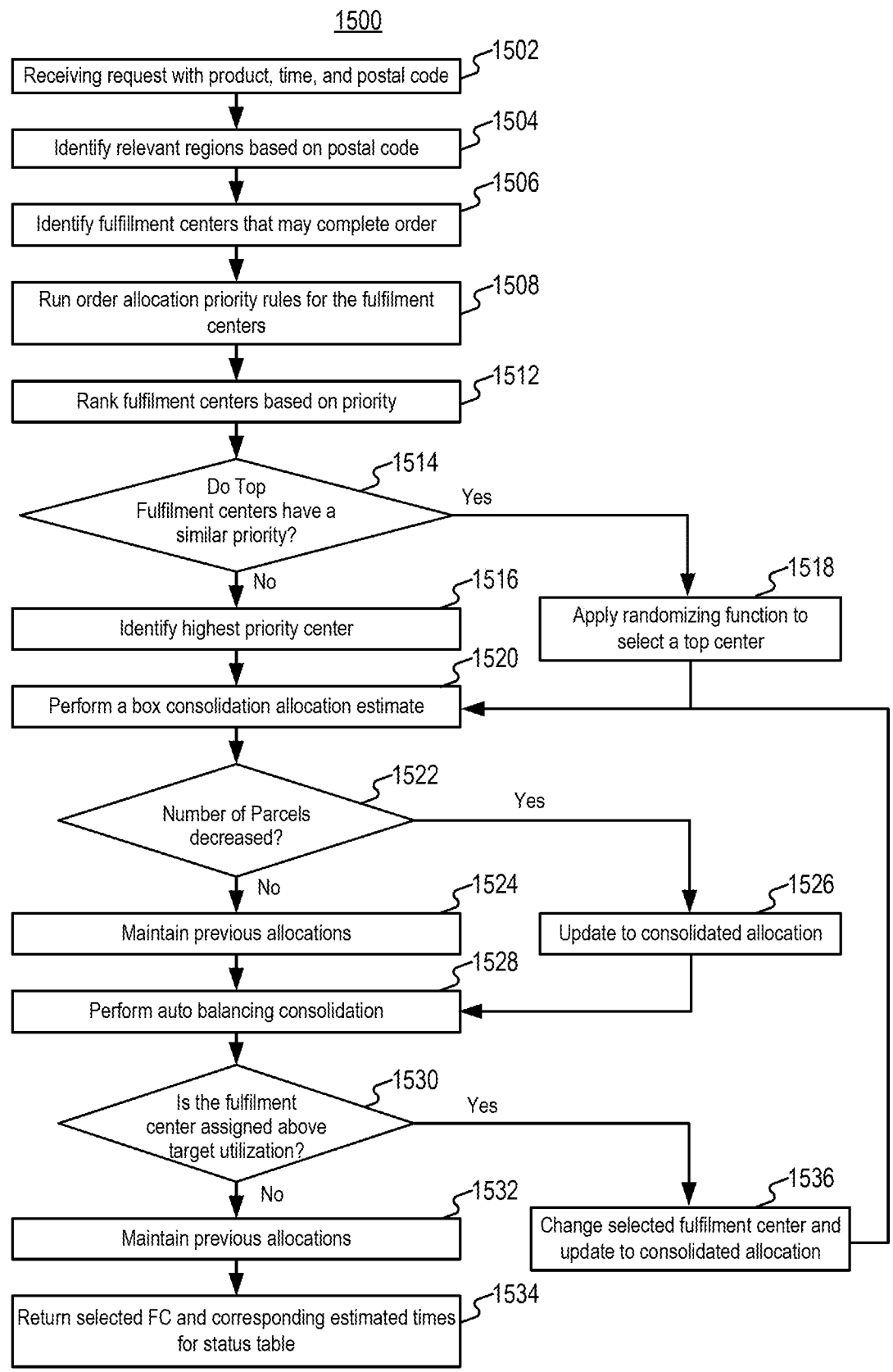
FIG. 15 is a flow chart of an exemplary process for assignment of fulfillment centers and determining a promised delivery date (PDD), consistent with disclosed embodiments.

FIG. 15 is a flow chart of an exemplary process for assignment of fulfillment centers and determining a promised delivery date (PDD), consistent with disclosed embodiments. In some embodiments, elements of system 300 may perform process 1500. For example, as disclosed in the steps description below, MDR system 320 may perform process 1500. Alternatively, or additionally, local domains 360 and/or third-party domains 365 may perform process 1500, or parts of process 1500. Further, in other embodiments system 100, or parts of system 100, may perform process 1500. For instance, SAT system 101, FC Auth 123, and/or FMG 115 (FIG. 1A) may perform process 1500.

In step 1502, MDR system 320 may receive a request for delivery estimate information and/or PDD. The request may include product, time, and postal code information. Based on the information in the request, MDR system 320 may identify relevant geographical regions in step 1504. For example, MDR system 320 may identify regions that may fulfill a potential order for the product based on the customer's postal code.

In step 1506, MDR system 320 may identify fulfillment centers that may complete a potential order for the product. In some embodiments, the region identified in step 1504 may include multiple fulfillment centers. In such embodiments, MDR system 320 may filter fulfillment centers based on ability to meet a PDD or availability of the requested product. In some embodiments, identifying which fulfillment centers may complete the potential order may be based on the type of product and/or order that is associated with the product. In step 1506 MDR system 320 may determine whether the product identification is associated with a specific product type or a specific delivery time product and identify fulfillment centers based on the availability of specific product types or the fulfillment center location regarding the destination address. For example, when the product identification is associated with a specific product type, MDR system 320 may perform operations of identifying fulfillment centers serving a region associated with the remote device, requesting available specific product type inventory from fulfillment centers, and selecting one of the fulfillment centers. Alternatively, or additionally, when the product identification comprises a specific delivery time product, MDR system 320 may perform operations of identifying a closest fulfillment center to the remote device, determining a cutoff based on the region and a distance between the remote device and the closest fulfillment center, and selecting the closest fulfillment center when the cutoff has not lapsed, in step 1506.

In step 1508, MDR system 320 may run order allocation priority rules for the fulfillment centers. In some embodiments, the allocation priority rules may be stored in memory devices within MDR system 320, which may retrieve allocation rules specific for the identified region(s) in step 1504. Alternatively, or additionally, the allocation priority rules may be stored in database 380, and MDR system 320 may query the data base once fulfillment centers have been identified in step 1506. In yet other embodiments, the allocation rules may be stored in elements of system 100. For instance, the allocation rules may be stored in FO system 113.

The order allocation rules may generate a priority score for each fulfillment center in the region. The priority allocation rules may include several rules with different preferences. For example, the order allocation rules may include a rule for delivery carrier that has a preference for staff carriers, such as staff delivery workers instead of contracted delivery personnel. That is, fulfillment centers in the region that have carriers on staff are preferred over fulfillment centers that do not have staff carriers and would need to contract with third-party carriers. Further, the order allocation rules may include an estimated delivery. Based on historic trends and an association of the product and each fulfillment center, the allocation rules may estimate a tentative delivery and give preference to fulfillment centers with shorter delivery dates. The rules may also include a staff assignment rule that gives preference to fulfillment centers in which staff has high staff availability or capacity. Moreover, the rules may also include a consideration for inbound date of the parcel to fulfillment center. With this rule the system may give preference to fulfillment centers that would receive the packet first to increase delivery certainty. Finally, the rules may also include preferences based on parcel weight. Some fulfillment centers may be better equipped to handle heavy or large parcels and may get preference for heavier parcel.

With the considerations of allocation rules, MDR system 320 may rank fulfillment centers based on the calculated priority in step 1512. For example, all the fulfillment centers in the region may be assigned a priority score and the fulfillment centers may be ranked based on the priority score.

In step 1514, MDR system 320 may determine whether top fulfillment centers have a similar priority. For example, MDR system 320 may determine whether priority scores of fulfillment centers are within a threshold. If the top fulfillment centers do not have a similar priority (step 1514: no), MDR system 320 may continue to step 1516 and identify the fulfillment center with the highest priority. However, if the top fulfillment centers have a similar priority (step 1514: yes), MDR system 320 may continue to step 918 an apply a randomizer function to select a top fulfillment center. The randomizer function may facilitate even distribution of load throughout fulfillment center without much required computation.

In step 1520, MDR system 320 may perform a box consolidation allocation estimate. With the selected fulfillment center, MDR system 320 may determine costs of shipment from the fulfillment center, including the number of boxes that would be used for shipping. To minimize cost and improve efficiency, in step 1520 MDR system 320 may perform a box consolidation to attempt to reduce the number of boxes or parcels for the tentative order of the product received in step 1502.

In step 1522, MDR system 320 may determine whether the number of parcel or boxes decreased with the box consolidation. If the number of parcels does not decrease (step 922: no), MDR system 320 may continue to step 1524 and maintain the previous allocations. However, if the number of parcels decreases after the box consolidation (step 1522: yes), MDR system 320 may continue to step 1526 and update the allocation to the consolidated allocation.

In step 1528, MDR system 320 may perform an auto balancing consolidation. The auto balancing consideration may attempt to balance the load in different fulfillment centers of the region identified in step 1504. With the goal of avoiding overburdening a specific center, MDR system 320 may perform an auto balancing that attempts to improve utilization of resources in different fulfillment centers.

In step 1530, based on the auto balancing consolidation, MDR system 320 may determine whether the fulfillment center that was assigned, in steps 1516 or 1518, is above a target utilization. If MDR system 320 determines the fulfillment center is not above the target utilization (step 1530: no), MDR system 320 may continue to step 1532 and maintain the previous allocation. However, if MDR system 320 determines the fulfillment center is above the target utilization (step 1530: yes), MDR system 320 may continue to step 1536 and change the selected fulfillment center to avoid overburdening the selected fulfillment center. In some embodiments of process 1500, MDR system 320 may return to step 1520 after step 1536 to re-run the box and auto balancing consolidations for the newly selected fulfillment center.

In step 1534, MDR system 320 may transmit the selected fulfillment center and corresponding estimated times to the requester of step 1502 and/or to a database, such as MDR database 325, to populate a status table. In some embodiments, the PDD or estimated delivery times may be pre-generated for the selected fulfillment center. For example, the PDD may be pre-selected based on a delivery date estimate associated with the fulfillment center, an order priority, an inbound date for the product, a postal code for delivery, or a quantity associated with the product.

Figure 16:
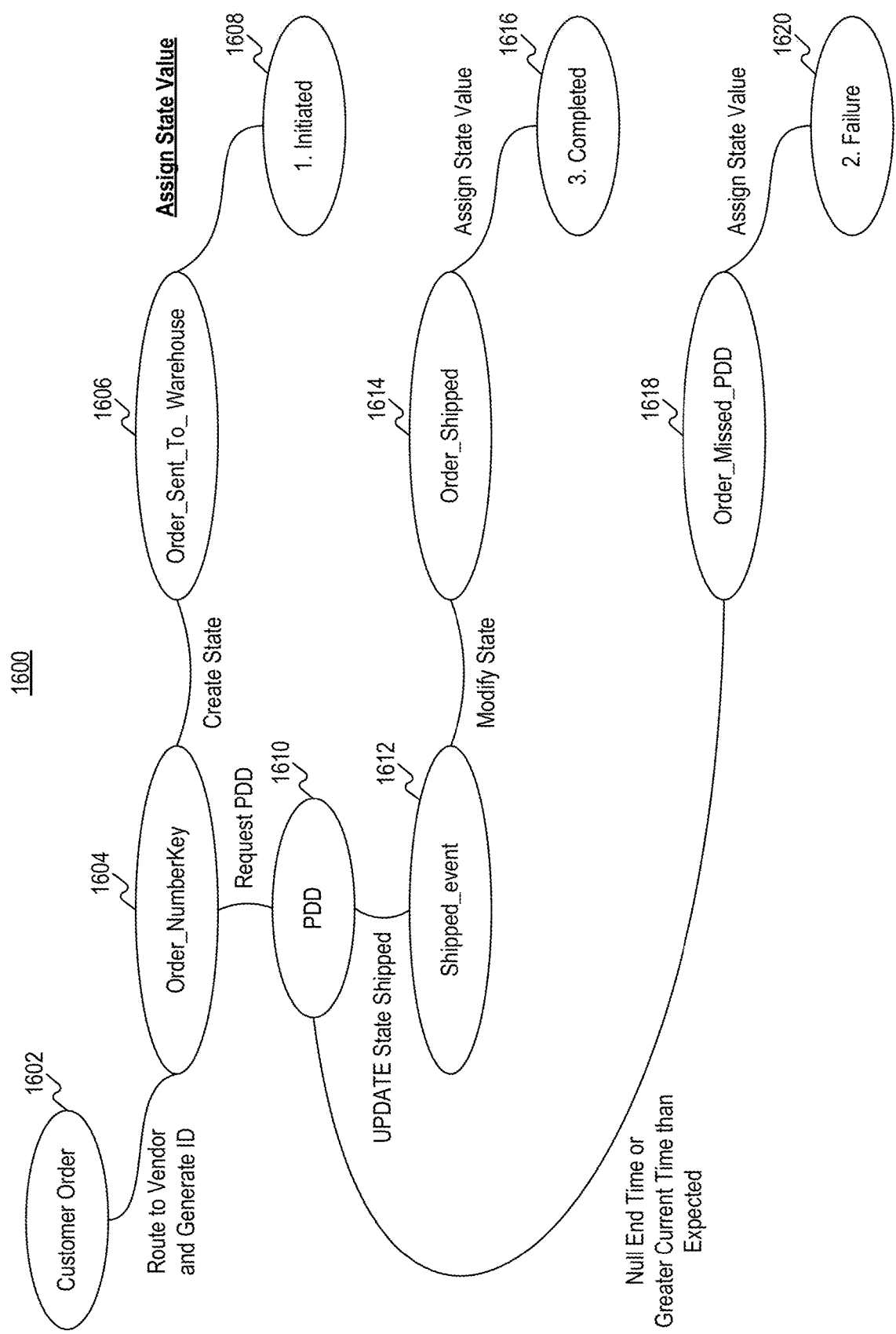
FIG. 16 is a state machine diagram describing an exemplary status determination process for orders in a multidomain network, consistent with disclosed embodiments.

FIG. 16 is a state machine diagram describing an exemplary status determination process 1600 for orders in a multidomain network, consistent with disclosed embodiments. In some embodiments, elements of system 300 may perform process 1600. For example, as disclosed in the steps description below, MDR system 320 may perform process 1600. Alternatively, or additionally, local domains 360 and/or third-party domains 365 may perform process 1600, or parts of process 1600. Further, in other embodiments system 100, or parts of system 100, may perform process 1500. For instance, SAT system 101, FC Auth 123, and/or FMG 115 (FIG. 1A) may perform process 1500.

FIG. 16 shows the potential statuses for an order that is being monitored by MDR system 320. Once an order is received in status 1602, MDR system 320 may route the order to a vendor (e.g., in third-party domain 365) that generates an ID for the order. In some embodiments, the vendor in third-party domain 365 may create an order key and a new state for the becomes order_numberkey in status 1604. With the order key a state variable may be created and assigned a state of Order_Sent_To_Warehouse in status 1606. Concurrently, MDR system 320, the assigned vendor, or the assigned fulfillment center, may request a PDD that gets added to the order state in status 1610.

As shown in FIG. 16, once a PDD is determined for an order (e.g., according to process 1500), the order state may follow two different pathways. If the order is shipped and an update request is received, the order state may be updated to shipped_event status 1612 and the status of the order may get modified to be order_shipped status 1614. But when an update request is not received an end time field is null or the system determines a missed PDD (e.g., current time is greater and expected end time), the order state may be modified to be order missed PDD status 1618.

FIG. 17 is a graphical user interface (GUI) 1700 showing an alert transmitted through an administrator network, consistent with disclosed embodiments. GUI 1700 may be hosted by MDR system 320 and displayed in client devices 350 (FIG. 3). GUI 1700 shows a header 1702, which may correspond to a status category indicated by a monitoring engine. GUI 1700 may also include a table of reported elements 1704(*a*)-(*z*). The table associates each of the reported elements 1704 with an order number 1710, a current state 1712, a start date 1714, an expected end date 0716, and an end time 1718. In some embodiments, the table in FIG. 17 may allow a user to filter, sort, or search for specific items. GUI 1700 may also include action buttons 1720, which may allow a user to reply or forward the alert displayed in GUI 1700.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Thus, the foregoing description has been presented for purposes of illustration only. It is not exhaustive and is not limiting to the precise forms or embodiments disclosed.

Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A system for centralized status monitoring in a multi-domain network, the system comprising:
    at least one processor; and
    at least one memory device comprising instructions that when executed configure the at least one processor to perform operations comprising:
        establishing connections with a first domain and a second domain;
        receiving a first request from the first domain to initiate a monitoring operation, the first request comprising a create request;
        generating a new entry in a status table stored in a first database, the status table comprising: an ID field, an expected finish field, and a status field;
        receiving a second request from the second domain to update the monitoring operation, the second request comprise an update status request;
        in response to receiving the second request, updating the new entry in the status table by modifying the status field;
        applying a monitor operation in response to receiving a third request from a monitoring engine, the third request comprising a report request and a category status, the monitoring engine being configured to periodically generate the third request; and
        generating an alert comprising entries in the status table in which the status field matches the category status.

2. The system of claim 1, wherein
    the first domain comprises an order reception domain;
    the second domain comprises an order shipment domain;
    establishing connection with the second domain comprises opening one or more ports in a shipment update receiver; and
    the category status comprises at least one of missed PDD or null end time.

3. The system of claim 1, wherein
    the first request comprises a first REST API call comprising an order key, the order key encoding an item ID and a vendor ID; and
    the second request comprises a second REST API call comprising shipment information.

4. The system of claim 3, wherein
    generating the new entry comprises estimating a value of the expected finish field based on the vendor ID, a current time, and a start time.

5. The system of claim 1, wherein establishing connections the first domain and the second domain comprises performing an automated discovery operation comprising:
    automatically discovering configuration templates associated with the first domain and the second domain;
    configuring the first domain, via one or more web APIs associated with the first domain, to generate create requests when new orders are received or orders are sent to fulfillment centers; and
    configuring the second domain, via one or more web APIs associated with the second domain, to generate update requests when an item is shipped.

6. The system of claim 5, wherein the operations further comprise:
    establishing connections with a third domain and a fourth domain by performing the automated discovery operation, the third domain being an inventory domain, the fourth domain being a third-party domain.

7. The system of claim 1, wherein:
    the monitoring engine is configurable to generate the third request periodically at least once a day; and
    generating the alert comprises broadcasting an email message to an administrator network.

8. The system of claim 1, wherein the status table further comprises a current state field, an expected state field, and a start time field.

9. The system of claim 1, wherein
    the first domain comprises an order reception domain;
    the second domain comprises at least one of an inventory domain or a purchase domain.

10. The system of claim 1, wherein:
    a value of the status field is selected from a group comprising: null value, order sent to warehouse value, order shipped value, missed PDD value, or completed value;
    the operations further comprise assigning the missed PDD value to entries in the status table based on comparing expected finish field with current time;
    the monitor operation identifies entries in the status table where the value of the state field is at least one of the null value or the missed PDD value; and
    the monitoring operation is performed through an automation server.

11. A computer-implemented method for centralized status monitoring in a multidomain network, the method comprising:
    establishing connections with a first domain and a second domain;
    receiving a first request from the first domain to initiate a monitoring operation, the first request comprising a create request;
    generating a new entry in a status table stored in a first database, the status table comprising: an ID field, an expected finish field, and a status field;
    receiving a second request from the second domain to update the monitoring operation, the second request comprise an update status request;
    in response to receiving the second request, updating the new entry in the status table by modifying the status field;
    applying a monitor operation in response to receiving a third request from a monitoring engine, the third request comprising a report request and a category status, the monitoring engine being configured to periodically generate the third request; and
    generating an alert comprising entries in the status table in which the status field matches the category status.

12. The method of claim 11, wherein
    the first domain comprises an order reception domain;
    the second domain comprises an order shipment domain;
    establishing connection with the second domain comprises opening one or more ports in a shipment update receiver; and
    the category status comprises at least one of missed PDD or null end time.

13. The method of claim 11, wherein
the first request comprises a first REST API call comprising an order key, the order key encoding an item ID and a vendor ID; and
the second request comprises a second REST API call comprising shipment information.

14. The method of claim 11, wherein establishing connections the first domain and the second domain comprises performing a automated discovery operation comprising:
automatically discovering configuration templates associated with the first domain and the second domain;
configuring the first domain, via one or more web APIs associated with the first domain, to generate create requests when new orders are received or orders are sent to fulfillment centers; and
configuring the second domain, via one or more web APIs associated with the second domain, to generate update requests when an item is shipped.

15. The method of claim 14, wherein the operations further comprise:
establishing connections with a third domain and a fourth domain by performing the automated discovery operation, the third domain being an inventory domain, the fourth domain being a third-party domain.

16. The method of claim 11, wherein the operations further comprise:
configuring the monitoring engine is to generate the third request at least once a day; and
generating the alert comprises broadcasting an email message to an administrator network.

17. The method of claim 11, wherein the status table further comprises a current state field, an expected state field, and a start time field.

18. The method of claim 11, wherein
the first domain comprises an order reception domain;
the second domain comprises at least one of an inventory domain or a purchase domain.

19. The method of claim 11, wherein:
a value of the status field is selected from a group comprising: null value, order sent to warehouse value, order shipped value, missed PDD value, or completed value;
the operations further comprise assigning the missed PDD value to entries in the status table based on comparing expected finish field with current time;
the monitor operation identifies entries in the status table where the value of the state field is at least one of the null value or the missed PDD value; and
the monitoring operation is performed through an automation server.

20. An apparatus comprising:
one or more processors; and
one or more memory devices comprising instructions that when executed configure the one or more processors to:
establish connections with a first domain and a second domain by performing an automated discovery operation comprising:
automatically discovering configuration templates associated with the first domain and the second domain;
configuring the first domain, via one or more web APIs associated with the first domain, to generate create requests when new orders are received or orders are sent to fulfillment centers; and
configuring the second domain, via one or more web APIs associated with the second domain, to generate update requests when an item is shipped;
receive a first request from the first domain to initiate a monitoring operation, the first request comprising a first REST API call comprising an order key, the order key encoding an item ID and a vendor ID;
generate a new entry in a status table stored in a first database, the status table comprising: an ID field, an expected finish field, and a status field;
receive a second request from the second domain to update the monitoring operation, the second request comprising a second REST API call comprising shipment information;
in response to receiving the second request, update the new entry in the status table by modifying the status field;
apply a monitor operation in response to receiving a third request from a monitoring engine, the third request comprising a report request and a category status, the monitoring engine being configured to generating the third request at least one once a day, the monitoring operation being performed through an automation server; and
broadcasting an alert email in an administrator network comprising entries in the status table in which a value of the status field is at least one of null or missed PDD.

* * * * *

UNITED STATES PATENT AND TRADEMARK OFFICE
CERTIFICATE OF CORRECTION

PATENT NO. : 11,062,253 B1  
APPLICATION NO. : 17/070573  
DATED : July 13, 2021  
INVENTOR(S) : Subrahmanya Pramod Nanduri et al.

Page 1 of 1

It is certified that error appears in the above-identified patent and that said Letters Patent is hereby corrected as shown below:

In the Claims

Claim 1, Column 41, Line 30, "comprise an" should read as --comprising an--.

Claim 5, Column 41, Lines 60-61, "connections the" should read as --connections with the--.

Claim 11, Column 42, Line 49, "comprise an" should read as --comprising an--.

Claim 14, Column 43, Lines 7-8, "connections the" should read as --connections with the--.

Claim 20, Column 44, Line 40, "generating the" should read as --generate the--.

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*